(12) United States Patent
Druml et al.

(10) Patent No.: US 12,061,290 B2
(45) Date of Patent: Aug. 13, 2024

(54) BEAM STEERING AWARE PIXEL CLUSTERING OF SEGMENTED SENSOR AREA AND IMPLEMENTING AVERAGING ALGORITHMS FOR PIXEL PROCESSING

(71) Applicant: Infineon Technologies AG, Neubiberg (DE)

(72) Inventors: Norbert Druml, Graz (AT); Philipp Greiner, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/322,035

(22) Filed: May 23, 2023

(65) Prior Publication Data

US 2023/0296735 A1  Sep. 21, 2023

Related U.S. Application Data

(63) Continuation of application No. 16/931,876, filed on Jul. 17, 2020, now Pat. No. 11,698,447.

(51) Int. Cl.
*G01S 7/481* (2006.01)
*G01S 7/4863* (2020.01)
*G01S 17/08* (2006.01)

(52) U.S. Cl.
CPC .......... *G01S 7/4817* (2013.01); *G01S 7/4863* (2013.01); *G01S 17/08* (2013.01)

(58) Field of Classification Search
CPC ...... G01S 7/4817; G01S 7/4863; G01S 17/08; G01S 17/10; G01S 7/4815; G01S 17/89; G01S 7/4861; G01S 17/894
See application file for complete search history.

(56) References Cited

U.S. PATENT DOCUMENTS

| | | |
|---|---|---|
| 10,775,508 B1 | 9/2020 | Rezk et al. |
| 2015/0049230 A1 | 2/2015 | Lee et al. |
| 2019/0204420 A1 | 7/2019 | Abari et al. |
| 2019/0285734 A1 | 9/2019 | Van Lierop et al. |
| 2020/0025929 A1 | 1/2020 | Kirillov |
| 2021/0109199 A1 | 4/2021 | Hennecke et al. |
| 2021/0181315 A1 | 6/2021 | Schnitzer et al. |
| 2021/0215828 A1 | 7/2021 | Hattass et al. |
| 2021/0364609 A1 | 11/2021 | Hall et al. |
| 2021/0377478 A1 | 12/2021 | Mori et al. |
| 2022/0018941 A1 | 1/2022 | Druml et al. |

*Primary Examiner* — Tuyen K Vo
(74) *Attorney, Agent, or Firm* — Harrity & Harrity, LLP

(57) ABSTRACT

A scanning system includes a scanning structure configured to rotate about at least one first scanning axis; a driver configured to drive the scanning structure about the at least one first scanning axis and detect a position of the scanning structure with respect to the at least one first scanning axis during movement of the scanning structure; a segmented pixel sensor including a plurality of sub-pixel elements arranged in a pixel area; and a controller configured to selectively activate and deactivate the plurality of sub-pixel elements into at least one active cluster and at least one deactivated cluster to form at least one active pixel from the at least one active cluster, receive first position information from the driver indicating the detected position of the scanning structure, and dynamically change a clustering of activated sub-pixel elements and a clustering of deactivated sub-pixel elements based on the first position information.

20 Claims, 23 Drawing Sheets

BEAM STEERING AWARE PIXEL CLUSTERING OF SEGMENTED SENSOR AREA AND IMPLEMENTING AVERAGING ALGORITHMS FOR PIXEL PROCESSING

RELATED APPLICATION

This application is a continuation of U.S. patent application Ser. No. 16/931,876, filed Jul. 17, 2020, which is incorporated herein by reference in its entirety.

BACKGROUND

Light Detection and Ranging (LIDAR), is a remote sensing method that uses light in the form of a pulsed laser to measure ranges (variable distances) to one or more objects in a field-of-view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

In general, pixel structures in conventional photodetector arrays are typically static. Furthermore, oversampling and averaging is a highly desired feature in order to increase signal-to-noise ratio (SNR) and to increase the receiver's robustness against events, other than typical noise (e.g., shot, white noise) like interferences from other LIDAR systems/transmitters. In addition to interference with other LIDAR systems/transmitters, also eye safety related laser pulse power limitations could lead to the need for averaging.

While a one-dimensional (1D) scanning approach supports high framerates, thereby enabling oversampling and averaging, a 2×1D Lissajous scanning approach supports only low framerates of, for example, 10-25 Hz. As a consequence, oversampling and averaging is not regarded as a feasible solution because it effectively further reduces the frame rate. In addition, if laser shooting requires averaging over several frames, high data rates occur and memory requirements increase. This is due to the need to store all data of a photodetector array over several frames to perform the averaging. In addition, averaging over two or more frames is affected by motion blur of the scenery.

If averaging is carried out in such a way that several quick consecutive laser pulses are used, then memory requirements are drastically reduced because no data needs to be stored over several frames. Furthermore, motion blur of the scenery is reduced. Quasi static scanners (laser shoot timing is not affected by any scanner oscillation) support this averaging approach (move to position, shoot several times, move to next position, shoot several times, and so on). In contrast, oscillating scanners, in which the oscillating motion of the scanner is continuous, introduce motion blur of the moving scanner (e.g., due to ~3 us time-of-flight of a single pulse, limited pulse-repetition frequencies (e.g., 100 kHz) of laser transmitters). Therefore, it is practically impossible to average over consecutive laser shoots while using a high-frequency oscillating scanner.

Furthermore, scenery may be illuminated by the LIDAR transmitter using a pulse-train of laser pulses or by way of a frequency-modulated continuous-wave (FMCW) light beam. Because the pixel structures in a photodetector array are static, an oscillating/moving scanner using these scenery illumination methods will cause a moving projection onto the photodetector array (e.g., 3 us time-of-flight of a single pulse, limited pulse-repetition frequencies (e.g., 100 kHz) of lasers). This moving projection over the static pixels will cause an impaired perception of the environment. Therefore, oversampling and averaging of a respective static pixel with fast consecutive laser pulses is practically impossible in case of a moving/oscillating scanner, because the scanner will move too much between consecutive laser shoots and between laser transmission and reception.

Therefore, a dynamically reconfigurable, non-static photodetector array that supports dynamic re-clustering of sub-sub-pixels and sub-pixels to form pixels for LIDAR receiver systems may be desirable.

SUMMARY

One or more embodiments provide a scanning system including a first scanning structure configured to rotate about at least one first scanning axis; a driver configured to drive the first scanning structure about the at least one first scanning axis and detect a position of the first scanning structure with respect to the at least one first scanning axis during movement of the first scanning structure; a segmented pixel sensor including a plurality of sub-pixel elements arranged in a pixel area; and a controller configured to selectively activate and deactivate the plurality of sub-pixel elements into at least one active cluster and at least one deactivated cluster to form at least one active pixel from the at least one active cluster, receive first position information from the driver indicating the detected position of the first scanning structure, and dynamically change a clustering of activated sub-pixel elements and a clustering of deactivated sub-pixel elements based on the first position information.

One or more embodiments provide a scanning method, including driving a first scanning structure about at least one first scanning axis; detecting a position of the first scanning structure with respect to the at least one first scanning axis during movement of the first scanning structure; selectively activating and deactivating a plurality of sub-pixel elements of a segmented pixel sensor into at least one active cluster and at least one deactivated cluster to form at least one active pixel from the at least one active cluster; and dynamically changing a clustering of activated sub-pixel elements and a clustering of deactivated sub-pixel elements based on first position information that indicates the detected position of the first scanning structure.

BRIEF DESCRIPTION OF THE DRAWINGS

Embodiments are described herein making reference to the appended drawings.

DETAILED DESCRIPTION

Figure 1:
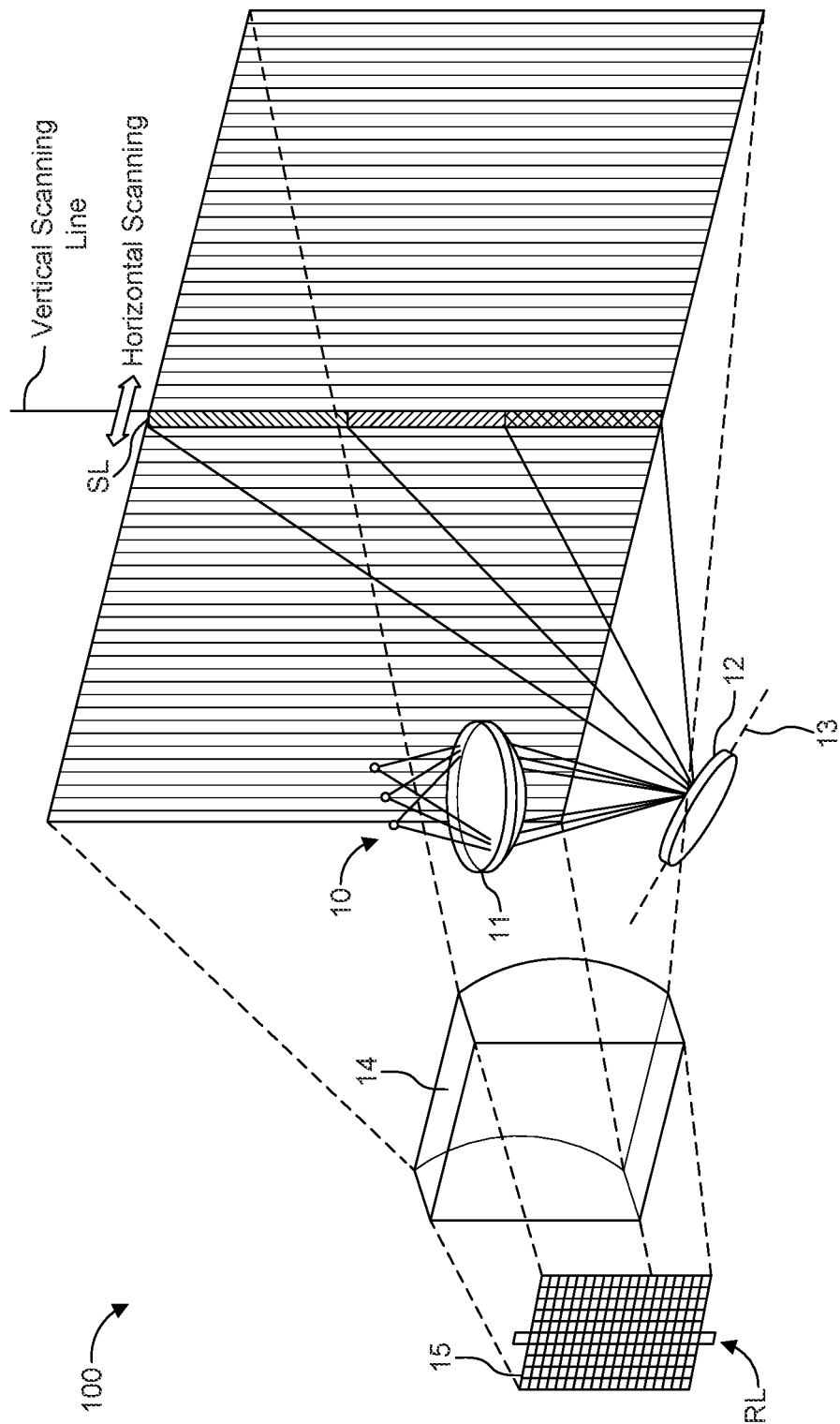
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits a pulse train of light pulses or a frequency-modulated continuous-wave (FMCW) light beam into a field-of-view and the light reflects from one or more objects by backscattering. A pixel array, such as a photodetector array, detects and measures the reflected beams received from objects illuminated by the transmitted light. In particular, LIDAR may use direct ToF sensors that send out short pulses of light that last just a few nanoseconds and then measure the time it takes for some of the emitted light to come back or indirect ToF sensors that send out continuous, modulated light and measure the phase of the reflected light to calculate the distance to an object. Either type may be used in the embodiments described herein.

In the embodiments describe herein, the photodetector array is a segmented pixel sensor in which pixels are flexibly and dynamically formed by combining sub-sub elements to form sub-elements and combining formed sub-elements to form a pixel. Thus, a pixel is clustered from a set of sub-elements (i.e., sup-pixels). The combining of sub-sub elements and the combining of sub-elements is programmable and can be flexibly and dynamically changed during a scanning operation while the pulse train or the FMCW light beam is being transmitted into the field-of-view. A 1D pixel array or a 2D pixel array can be created depending on how the sub-sub elements and the sub-elements are combined to form the pixels.

The smallest unit of the photodetector array is the sub-sub element, which may be a single diode, such as an avalanche photodiode (APD) or a single-photon avalanche diode (SPAD). Hereinafter, a sub-sub element will be referred to as a sub-sub-pixel.

A sub-element, hereinafter referred to as a sub-pixel, is clustered from a set of dynamically selected sub-sub pixels and each pixel is clustered from a set of dynamically selected sub-pixels.

For example, a sub-sub-pixel may be a single SPAD (or APD). An 8×8 cluster of SPADs or APDs may form a sub-pixel. In the case of using SPADs, the sub-pixel may be referred to as a silicon photomultiplier (SiPM). A 4×4 cluster of sub-pixels (e.g., 32×32 SPADs or APDs) may form a pixel. One or more pixels may be formed at any given time.

The sub-sub-pixels and the sub-pixels used for forming a pixel may be dynamically selected by a system controller implementing a clustering algorithm. The number of sub-sub-pixels and sub-pixels used for forming a pixel is entirely configurable and programmable. Furthermore, the selection of sub-sub-pixels and sub-pixels used for forming a pixel may be formed by a single contiguous grouping, two or more contiguous groupings that are themselves spaced apart (i.e., noncontinuous) with respect to each other by at least one or more sub-sub-pixels. Furthermore, each grouping of sub-sub-pixels and sub-pixels may be grouped in any shape and need not be in a square formation.

Each sub-sub-pixel may be readout as a sub-sub measurement signal in the form of raw analog or digital data. Each sub-sub measurement signal originating from a pixel (i.e., from the sub-sub-pixels of the pixel) may be summed and/or averaged together by a readout processing chain to generate a pixel measurement signal.

Differences in return times for each light pulse across multiple pixels of the pixel array can then be used to make digital 3D representations of an environment or to generate other sensor data. For example, in a direct ToF system, the light source may emit a single light pulse, and a receiver circuit electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

For example, the light source may emit a single light pulse, and a time-to-digital converter (TDC) electrically coupled to the pixel array may count from the time the light pulse is emitted, corresponding to a start signal, and record a time (i.e., a ToF hit time) the reflected light pulse is received at the receiver (i.e., at the pixel array), corresponding to a ToF hit signal.

Alternatively, an analog-to-digital converter (ADC) may be electrically coupled to the pixel array (e.g., indirectly coupled with intervening elements in-between) for pulse detection and ToF measurement. For example, an ADC may be used to estimate a time interval between start and ToF hit signals with an appropriate algorithm.

A scan such as an oscillating horizontal scan (e.g., from left to right and right to left of a field-of-view) can illuminate a scene in a continuous scan fashion. Each firing of a laser beam by the light sources can result in a scan line in the "field-of-view." By emitting successive light pulses or a FMCW light beam in different scanning directions, an area referred to as the field-of-view can be scanned and objects within the area can be detected and imaged. Thus, the field-of-view represents a scanning plane having a center of projection. Raster scanning or Lissajous scanning using to orthogonal scanning axes could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a segmented pixel sensor 15. The receiver may further include receiver circuitry, such as data acquisition/readout circuitry and data processing circuitry, as will be further described according to FIG. 2.

While this arrangement represents one example of a type of LIDAR system, it will be appreciated that other types of LIDAR systems, such as those used in flash LIDAR, may also be used. In addition, the LIDAR scanning system 100 may be rotated to scan in a different scanning direction. For example, the LIDAR scanning system 100 may be rotated 90° to scan in the vertical direction instead of the horizontal direction. Thus, the embodiments described herein are not limited to a particular type of light transmitter or ToF system and may be also applied to other types of ToF systems.

Turning back to FIG. 1, the segmented pixel sensor 15 is arranged in such a manner that an intended field-of-view is mapped vertically on the vertical extension of the segmented pixel sensor 15. A received light beam will hit only a specific row or group of rows of the detector array depending on the vertical angle of the received light beam. The intended field-of-view may be further mapped horizontally on the horizontal extension of the segmented pixel sensor 15.

At its smallest unit, the segmented pixel sensor 15 may be formed by an array of analog or digital sub-sub-pixel elements. In the case of a forming a SiPM (i.e., a sub-pixel), each SiPM comprises a plurality of microcells, each microcell comprises a SPAD. Thus, each SiPM comprises a set of two or more SPADs.

SPADs, like avalanche photodiodes (APDs), exploit the incident radiation triggered avalanche current of a p-n junction when reverse biased. The fundamental difference between SPADs and APDs is that SPADs are specifically designed to operate with a reverse-bias voltage well above its breakdown voltage. This kind of operation is also called Geiger-mode (as opposed to the linear-mode for the case of an APD).

In this example, the illumination unit 10 includes multiple light sources (e.g., laser diodes or light emitting diodes) that are linearly aligned in single bar formation and are configured to transmit light used for scanning the field-of-view for objects. The light emitted by the light sources is typically infrared light although light with another wavelength might also be used. As can be seen in the embodiment of FIG. 1, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field-of-view.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1, each of the light sources is associated with a different vertical region in the field-of-view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is employed in a 1D scanning system and is configured to rotate about a single scanning axis. Distinguished from 2D-MEMS mirrors (2D MEMS scanners), a 1D MEMS mirror has only one degree of freedom for scanning by which the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

It will be appreciated that 2D scanning systems such as a 2D MEMS mirror that oscillates about two orthogonal scanning axes or two 1D MEMS mirrors (i.e., a 2×1D scanner system) that each oscillate about a single scanning axis orthogonal to each other, may also be used. The latter may be referred to as a Lissajous scanning system.

Typically, a 1D scanning system transmits a scanning line of laser light into the field-of-view. In contrast, a 2D scanning system transmits a scanning spot (e.g., a circular or squared spot) of laser light into the field-of-view. Thus, the scanning line SL and the receiving line RL shown in FIG. 1 for a 1D scanning system may be replaced by a scanning dot and a receiving dot, respectively, for a 2D scanning system.

The MEMS mirror 12 in FIG. 1 is configured to continuously oscillate "side-to-side" about a single scanning axis 13 such that the light reflected from the MEMS mirror 12 (i.e., the vertical scanning line of light) oscillates back and forth in a horizontal scanning direction. The movement of the MEMS mirror 12 is continuous for a full scanning period (e.g., for a full scan of a field-of-view). A scanning period, an oscillation period, or frame is defined, for example, by one complete oscillation from a first edge of the field-of-view (e.g., left side) to a second edge of the field-of-view (e.g., right side) and then back again to the first edge. A mirror period or frame of the MEMS mirror 12 corresponds to a scanning period. Thus, a frame is one complete scan of the field-of-view through a full mirror period.

Thus, the field-of-view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field-of-view. Thus, the field-of-view may be continuously scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors or even 2D mirrors can also be used. In addition, the degree of rotation is not limited to +/−15 degrees, and the field-of-view may be increased or decreased according to the application. Thus, a one-dimensional scanning mirror is configured to oscillate about a single scanning axis and direct the laser beams at different directions into a field-of-view. Hence, a transmission technique includes transmitting the beams of light into the field-of-view from a transmission mirror that oscillates about a single scanning axis such that the beams of light are projected as a vertical scanning line SL into the field-of-view that moves horizontally across the field-of-view as the transmission mirror oscillates about the single scanning axis. LIDAR systems using 1D-scanning mirrors can use a more relaxed shot-rate of the illumination unit 10 (i.e., transmitter) compared to 2D-scanning mirrors which use laser points for scanning the field-of-view which requires more shots for the transmitter to scan a field-of-view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the segmented pixel sensor 15 that receives the reflected light as a receiving line RL and is configured to generate electrical measurement signals. The segmented pixel sensor 15 generates digital measurement signal based on received light. The digital measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1. As the vertical scanning line SL moves horizontally across the field-of-view, the vertical column of light RL incident on the 2D segmented pixel sensor 15 also moves horizontally across the 2D segmented pixel sensor 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The segmented pixel sensor 15 receives reflective light pulses as the receiving line RL and generates digital electrical signals in response thereto. Since the time of transmission of each light pulse from the illumination unit 10 is known, and because the light travels at a known speed, a time-of-flight computation using the electrical signals can determine the distance of objects from the segmented pixel sensor 15. Alternatively, for indirect measurements, a phase difference between the transmitted light and received, reflected light can be measured to calculate the distance to an object. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving sub-sub-pixels of the segmented pixel sensor 15. Each receiving sub-sub-pixel emits a short electrical pulse that is read out by the readout circuit.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror 12, an area (i.e., a field-of-view) can be scanned, a three-dimensional image can be generated, and objects within the area can be detected.

The signal processing chain of the receiver may also include an ADC for each photodiode. The ADC is configured to convert the analog electrical signals from the photodiode into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a ToF hit signal (i.e., corresponding to a timing of receiving an analog electrical signal at an ADC) with an appropriate algorithm.

In one instance, all light sources of the illumination unit 10 may be used to generate the scanning line SL/receiving line RL. In this case, the receiving line RL may extend along a full length of the segmented pixel sensor 15. In another instance, only a subset of the light sources may be used to generate the scanning line SL/receiving line RL. In this case, the receiving line may extend along only a portion of the segmented pixel sensor 15 in the lengthwise direction.

The location and/or shape of activated pixels of the segmented pixel sensor 15 may be dynamically changed during a scanning operation to follow the received light (i.e., the receiving line or the receiving dot) as it moves across the segmented pixel sensor 15 synchronously with the scanning motion of the transmitted light. Accordingly, those sub-sub pixels located in a location on the segmented pixel sensor 15 in which received light is expected can be selectively activated, while those sub-sub pixels located outside of that expected location may be selectively deactivated.

Figure 2:
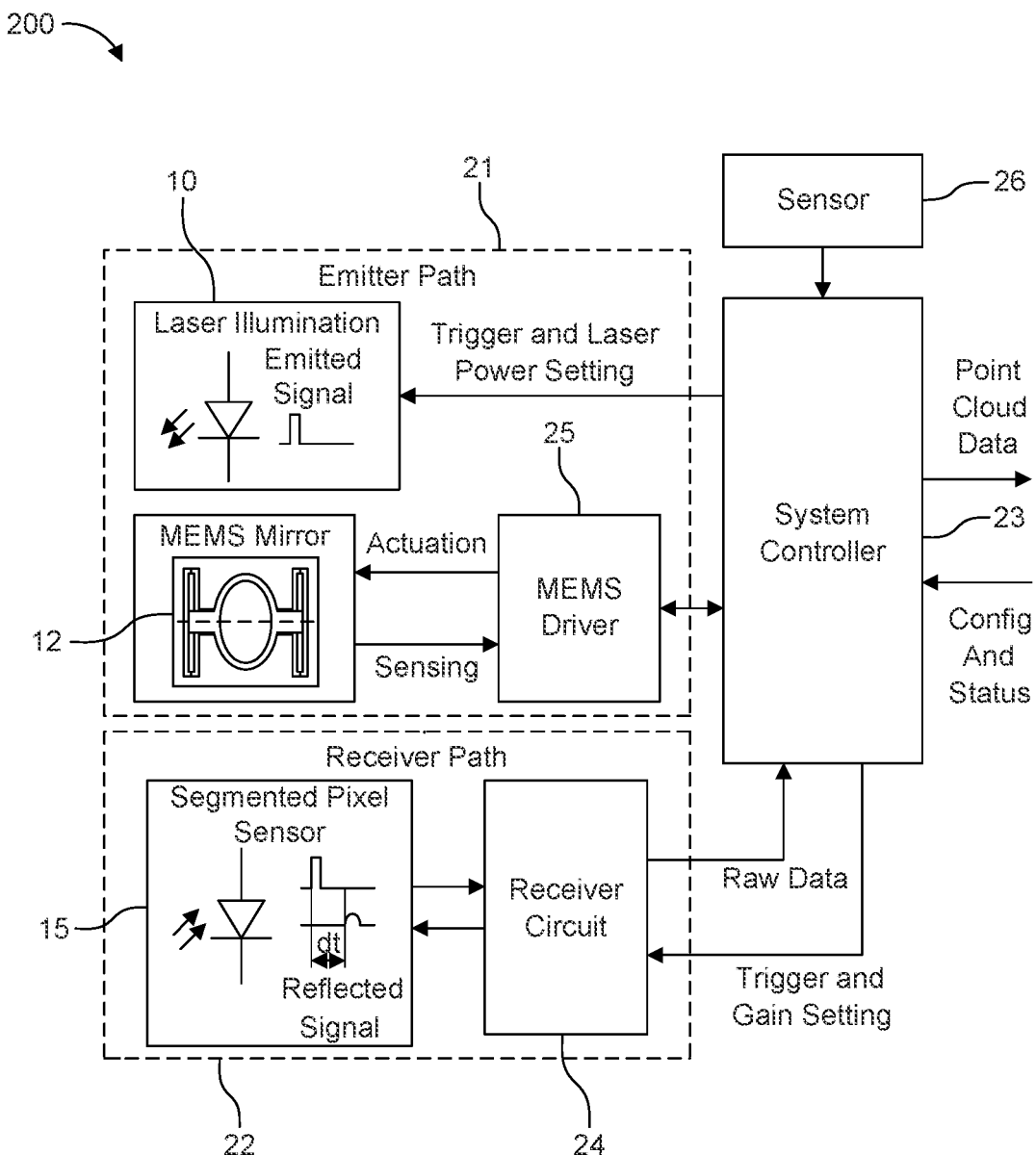
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw analog or digital data from the receiver unit 22 and perform processing thereon (e.g., via analog and/or digital signal processing) for generating object data (e.g., point cloud data). Thus, the system controller 23 includes at least one processor and/or processor circuitry (e.g., comparators and digital signal processors (DSPs)) of a signal processing chain for processing data, as well as control circuitry, such as a microcontroller, that is configured to generate control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. The MEMS driver 25 may continuously drive the MEMS mirror 12 during a full scan of a field-of-view. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 includes the segmented pixel sensor 15 as well as a receiver circuit 24 that includes a digital readout circuit. As will be described in more detail below, a pixel of the segmented pixel sensor 15 may be coupled to a readout channel of the receiver circuit 24, which receives the electrical signals therefrom. A pixel, and more particularly, its sub-sub-pixels, that is coupled to the receiver circuit 24 may be referred to as active, while a sub-sub pixel that is not coupled to the receiver circuit 24 may be referred to as inactive.

The readout circuit includes N output channels (e.g., 32 channels) configured to read out measurement signals received from a selected pixel of the segmented pixel sensor 15. Furthermore, more than one pixel may be formed and read out. One acquisition of pixel data (i.e., a pixel measurement signal) from the segmented pixel sensor 15 on an output channel may be referred to as a sample, and each output channel may be used to acquire different samples from different pixels. Each sample may further correspond to a sample time, at which time pixel measurement signals are read out from one or more pixels.

Thus, the receiver circuit 24 may receive the digital electrical signals from the pixels of the segmented pixel sensor 15 and transmit the electrical signals as raw analog or digital data to the system controller 23 for ToF measurement and generation of object data (e.g., 3D point cloud data).

The receiver circuit 24 may also receive trigger control signals from the system controller 23 that triggers an activation of one or more sub-sub-pixels, or conversely disables one or more sub-sub-pixels. Thus, the system controller 23 may control which sub-sub-pixels are enabled and which are disabled. The readout circuit 24, in turn, may be configured to activate or deactivate particular sub-sub-pixels of the segmented pixel sensor 15. The receiver circuit 24 may also receive gain setting control signals for controlling the gain of one or more sub-sub-pixels.

Figure 3A:
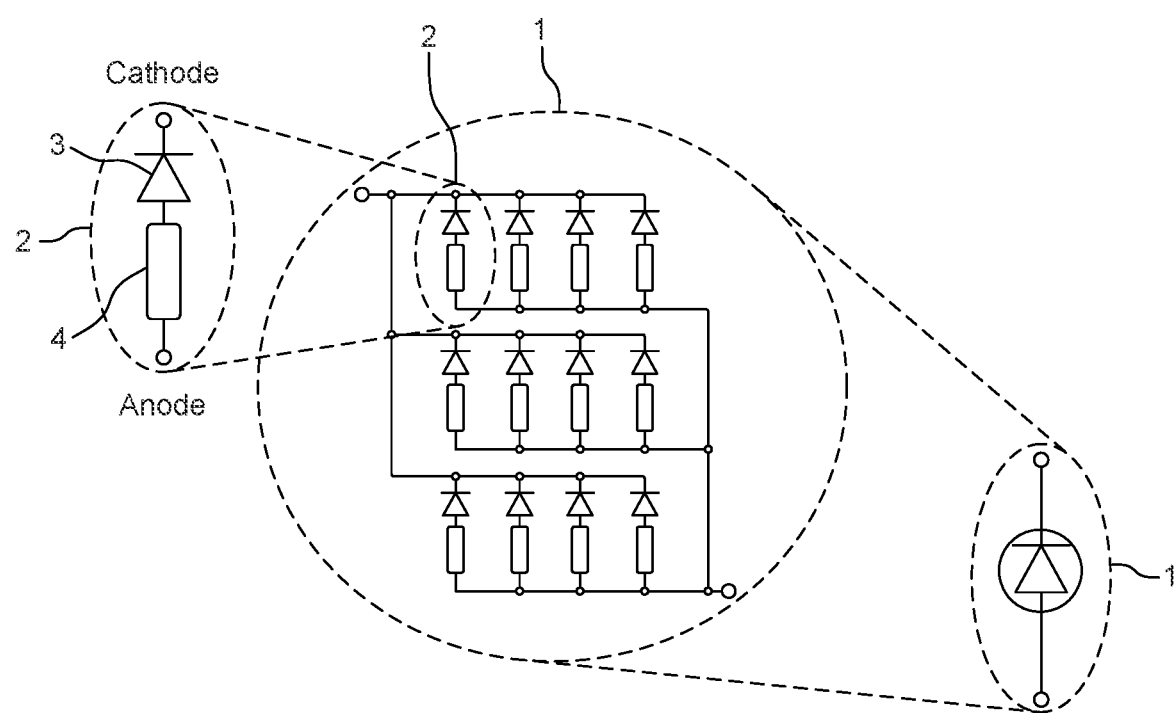
FIG. 3A is a schematic diagram of a SiPM pixel (i.e., a 2D SiPM pixel) according to one or more embodiments.
Figure 3B:
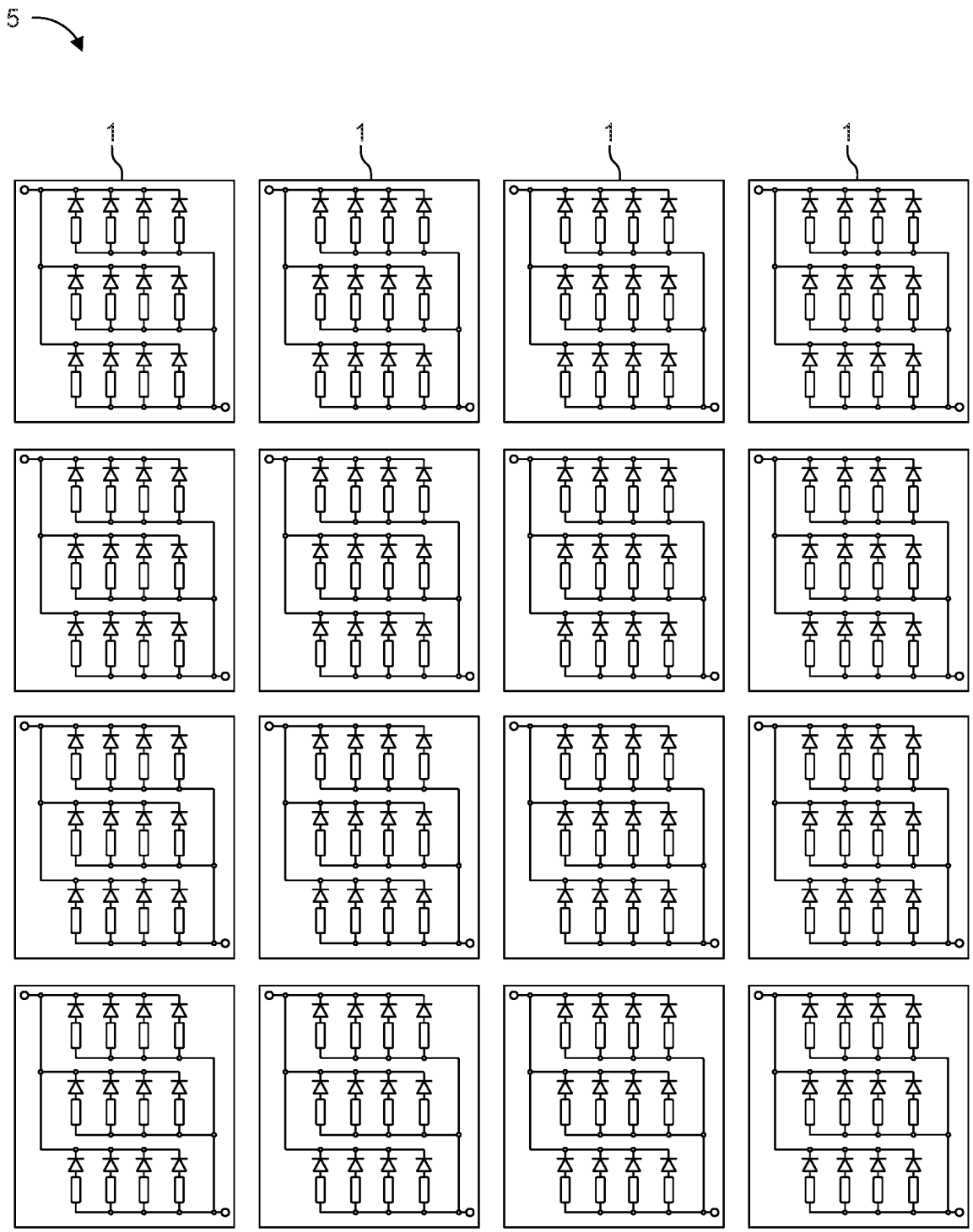
FIG. 3B is a schematic diagram of a 2D SiPM pixel array according to one or more embodiments.

FIG. 3A is a schematic diagram of a SiPM sub-pixel 1 according to one or more embodiments. FIG. 3B is a schematic diagram of an example pixel 5 of the segmented pixel sensor 15 according to one or more embodiments. Thus, FIG. 3B represents only a portion of the full segmented pixel sensor 15.

In particular, the segmented pixel sensor 15 is made up of an array of SPADs, which in this case are arranged into a 4×4 array of SiPM sub-pixels 1 to form a pixel 5. However, as will be explained, this configuration of SiPM sub-pixels can be adjusted both in shape and size to form the pixel 5. Each SiPM sub-pixel 1 includes an array of microcells 2, each of which includes a SPAD 3 in series with a quenching circuit 4 (e.g., a resistor or a transistor) Thus, each SiPM sub-pixel 1 comprises selectable cluster of sub-sub-pixels (i.e., SPADs) that are selected from the full array of sub-sub-pixels in the segmented pixel sensor 15. In other words, a single SiPM sub-pixel may be referred to as a SPAD array and each SPAD may be referred to as a SPAD sub-sub-pixel.

Every SPAD is inherently a binary device—either a photon has struck it or it has not. Upon receiving a photon, a SPAD 3 generates an electrical pulse. The intensity of the signal generated by a SiPM is obtained by counting (photon counting) the number of output pulses generated by its active SPADs within a measurement time slot, or by detecting cumulative current of all SPADs not resolving each photon event, while the time-dependent waveform of the signal is obtained by measuring the time distribution of the output signal (photon timing). The latter may be obtained by means of operating the SPAD detector in time-correlated single photon counting (TCSPC).

In particular, a SPAD is a solid-state photodetector in which a photon-generated carrier (via the internal photoelectric effect) can trigger a short-duration but relatively large avalanche current. This avalanche is created through a mechanism called impact ionization, whereby carriers (electrons and/or holes) are accelerated to high kinetic energies through a large potential gradient (voltage). If the kinetic energy of a carrier is sufficient (as a function of the ionization energy of the bulk material) further carriers are liberated from the atomic lattice. The number of carriers thus increases exponentially from, in some cases, as few as a single carrier.

The avalanche current rises swiftly [sub-nanosecond risetime] to a macroscopic steady level in the milliampere range. If the primary carrier is photo-generated, the leading edge of the avalanche pulse marks [with picosecond time jitter] the arrival time of the detected photon. The current continues until the avalanche is quenched by lowering the bias voltage VBIAS stored by the internal capacitance down to or below breakdown voltage VBD The internal capacitance is a stray or parasitic capacitance of the SPAD and is represented by an internal capacitor CD in FIGS. 5A-5D.

When this occurs, the lower electric field is no longer able to accelerate carriers to impact-ionize with lattice atoms, therefore the current ceases. In order to be able to detect another photon, the bias voltage at the internal capacitance must be raised again (i.e., recharged) above the breakdown voltage. This recharging time results in the SPAD being blind or deactivated until the internal capacitance is recharged above the breakdown voltage. The circuit responsible for quenching the avalanche current and the subsequent recharging of the internal capacitance is referred to as a quenching circuit 4. The quenching circuit 4 may be an active quenching-recharging circuit that includes active components, like a transistor, that is actively triggered by a clock signal or a passive quench-recharging circuit that includes passive components, like a resistor, that is not actively triggered.

This quenching and recharge operation requires a suitable circuit, which senses the leading edge of the avalanche current, generates a standard output pulse synchronous with the avalanche build-up, quenches the avalanche by lowering the bias down to or below the breakdown voltage, and restores the photodiode to the operative level (i.e., to above the breakdown voltage).

Additionally, each SPAD may be selectively activated and deactivated. This can be done, for example, selectively coupling (activating) or decoupling (deactivating) a SPAD to an output of the segmented pixel sensor 15 by a multiplexer or selectively activating or deactivating its respective quenching-recharging circuit 4 so that a SPAD no longer recharges to an operational level. However, it will be appreciated that the activation and deactivation of a SPAD is not limited to these example techniques. In the case of using APDs as the sub-sub-pixels, selectively coupling (activating) or decoupling (deactivating) an APD to an output of the segmented pixel sensor 15 may be used for activation and deactivation of the APDs.

In the example shown in FIGS. 3A and 3B, twelve microcells 2 are included. Thus, a SiPM 1 has twelve SPADs arranged in an array. The output of the pixel 5 formed by the 4×4 SiPM array is cumulative according to the electrical signals generated by the SPADs 3. For example, if only one SPAD in the pixel detects a photon during a measurement period, the output of the pixel 5 may have an intensity 1. On the other hand, if five SPADs in the pixel each detect a photon during a measurement period, the output of the pixel 5 may have an intensity 51. If all SPADs in the array each detect a photon during a measurement period, the output of the pixel 5 may have an intensity 1921 (i.e., the total number of SPADs making up the pixel 5). As a result, the contributions of all SPADs 3 in the formed pixel 5 are added by a summing circuit to generate the pixel output signal (i.e., the pixel measurement signal). The number of SiPM sub-pixels and the number of SPAD sub-sub-pixels within each pixel 5 is entirely configurable and may be actively changed during a scanning operation according to a clustering algorithm implemented by the system controller 23.

The following example embodiments may use dynamic pixel clustering for a segmented pixel sensor, and may dynamically adapt its pixels clustering for non-stationary beam steering such that the adapted pixels follow the projection of the laser beam on the segmented pixel sensor that is steered into the field-of-view. As a consequence, pulse-train or continuous (FMCW) illumination is enabled with a continuously moving/oscillating scanner (i.e., a non-quasi static scanner), oversampling and averaging is enabled over multiple consecutive laser shoots, and long-range scanning is enabled without motion blur because the motion of the continuously oscillating mirror is compensated while the laser light travels into the field-of-view and back.

According to the following example embodiments, sub-sub-pixels (e.g., SPADs or APDs) are freely grouped (i.e., on a dynamic basis) as a configurable sub-pixel (e.g., SiPM) and sub-pixels are freely grouped (i.e., on a dynamic basis) as a configurable pixel to effectively define "pixels" on the fly. These "pixels" are not limited to a fixed raster but can vary in size, shape, and location in the segmented pixel sensor 15. This allows the sensor to more precisely match the pixels to the shape and expected location of the received laser light. It is also possible to flexibly increase or reduce the resolution by reducing or increasing the size of the "pixels". This works both for 2D scanning LIDAR where round light spots are received at the segmented pixel sensor 15, as well as 1D LIDAR working with receiving lines of light. Since the location of the "pixels" can vary freely, the sensor can also compensate for distortion or blur caused by the moving MEMS mirror(s).

Effectively, only a small portion of the microcell array may be active at any given time. This reduces power consumption, but equally important it also reduces the amount of data being transferred. It would not be possible to transfer data from the entire segmented pixel sensor 15 at 1 GHz off the receiver chip.

FIGS. 4A-4H illustrate various ways of clustering sub-pixels 1 into pixels 5 on a segmented pixel sensor 15 according to one or more embodiments. Each sub-pixel 1 is formed by a selected cluster of sub-sub-pixels (not illustrated).

Figure 4A:
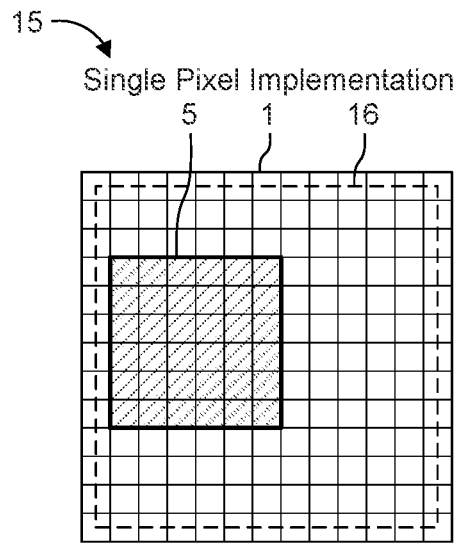
FIGS. 4A-4H illustrate various ways of clustering sub-pixels into pixels on a segmented pixel sensor according to one or more embodiments.
Figure 4B:
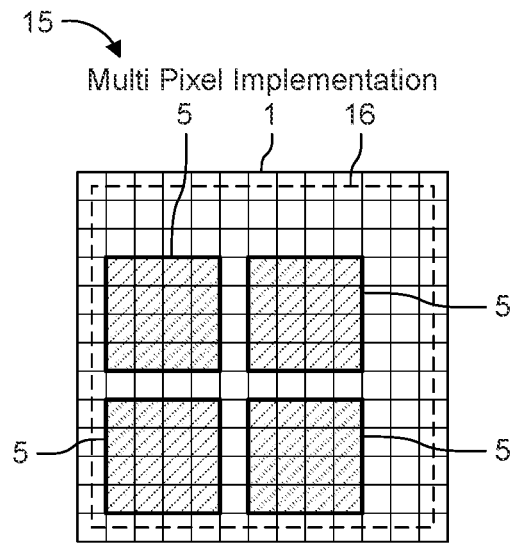
Figure 4C:
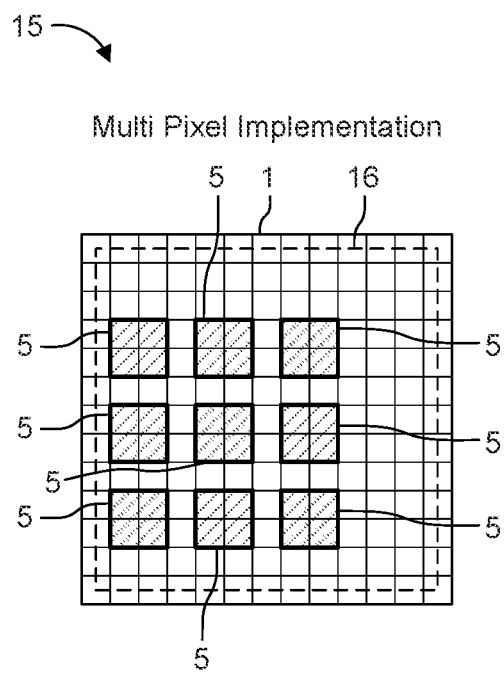

In FIG. 4A, a single pixel 5 is formed from a cluster of sub-pixels 1. The pixel 5 is located in a projection of the illuminated field-of-view 16 that is projected onto the segmented pixel sensor 15.

Figure 4D:
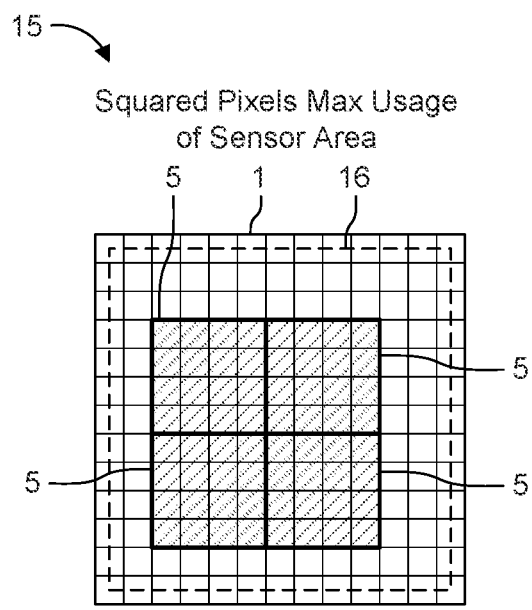
Figure 4E:
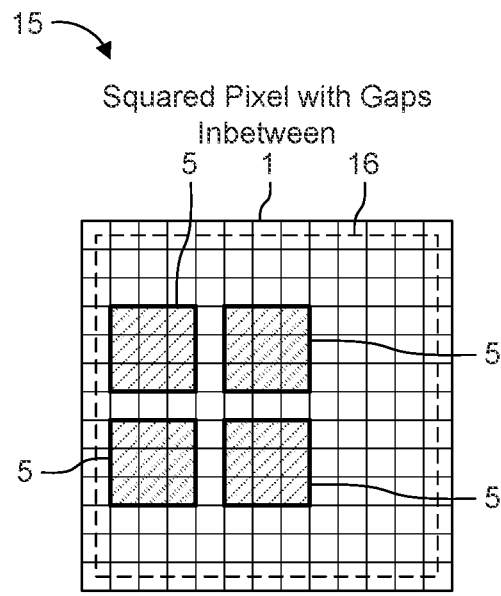
Figure 4F:
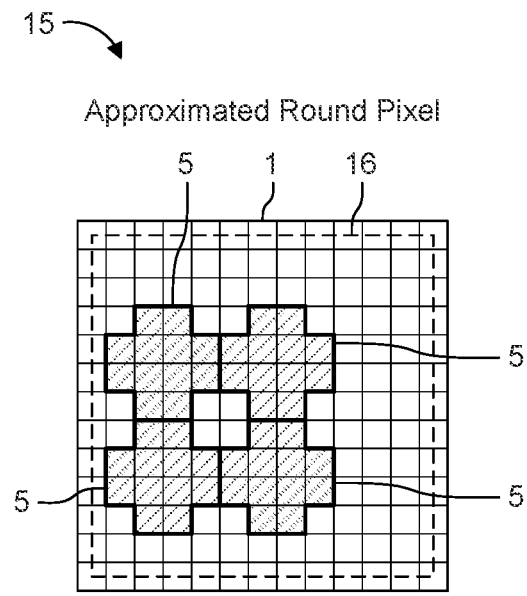
Figure 4G:
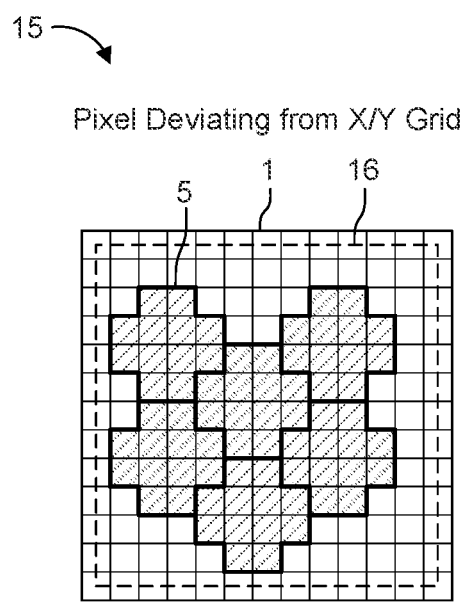
Figure 4H:
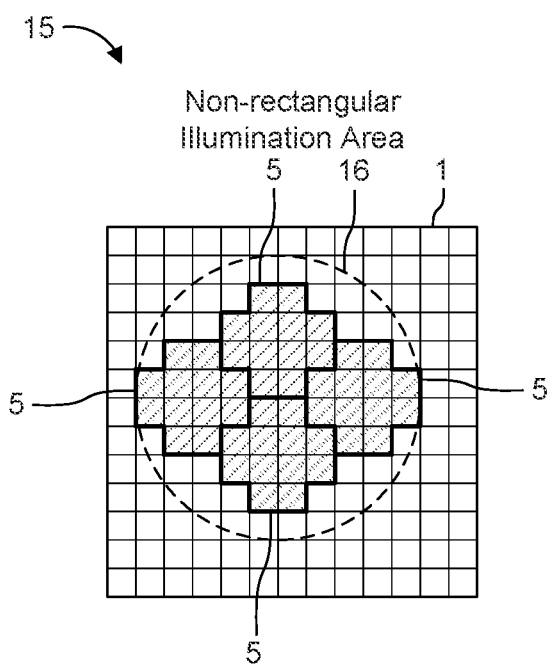

In FIGS. 4B-4H, multiple pixels 5 are formed in different arrangements based on different clustering of the sub-pixels 1. For example, in FIGS. 4B, 4C, and 4E, squared pixels 5 are formed with gaps therebetween. To form a gap, two neighboring pixels 5 are spatially separated by at least one deactivated sub-sub-pixel or deactivated sub-pixel. In FIGS. 4D, 4F, 4G, and 4H, all pixels 5 are contiguous to at least one adjacent pixel. In FIG. 4D, four squared pixels 5 are combined to form a sensing area to maximize a coverage area on the segmented pixel sensor 15. In FIGS. 4F-4H, sub-pixels 1 are clustered to form non-squared (e.g., cross-shaped) pixels 5. The pixels 5 in FIG. 4F are combined to form a sensing area to approximate a circular sensing area with a gap in the center. The pixels 5 in FIG. 4G are combined to form a sensing area that deviates from an X/Y grid. Lastly, the pixels 5 in FIG. 4H are shaped and combined to form a non-rectangular area. Here, in FIG. 4H, the illumination area is circular and the pixels 5 are combined in a way that conforms approximately to the shape of the illumination area (i.e., to approximate a circular sensing area).

Apart from the pixel structures illustrated in FIGS. 4A-4H, also the illumination of the pixels may differ. For example, the illuminated sensor area can be larger than the respective utilized sensor area, can match the respective utilized sensor area, or can be smaller than the respective utilized sensor area. Furthermore, the number of averaging may be fixed for x-scanning or for y-scanning, while the number of averaging may vary for Lissajous scanning depending on how often in a row a pixel is illuminated, or even as a fraction for a partially illuminated pixel. In the following, different embodiments showing the dynamic activation of pixels and averaging are provided.

FIGS. 5A-5D illustrate a dynamic formation of pixels that move across a segmented pixel sensor according to one or more embodiments. FIGS. 5A-5D represent a sequential order of laser shooting events (e.g., four steps of four consecutive laser transmissions or laser shoots) of a Lissajous scanning operation. Thus, a first laser is transmitted into the field-of-view at a first transmission direction at a first time event (i.e., in a first laser shoot) in step N, where N in an integer, a second laser is transmitted into the field-of-view at a second transmission direction at a second time event (i.e., in a second laser shoot) in step N+1, a third laser is transmitted into the field-of-view at a third transmission direction at a third time event (i.e., in a third laser shoot) in step N+2, and a fourth laser is transmitted into the field-of-view at a fourth transmission direction at a fourth time event (i.e., in a fourth laser shoot) in step N+3. A similar principle can be applied to a FMCW light beam, where each step corresponds to a different consecutive frequency ramp of four consecutive frequency ramps of the light beam.

Here, an illumination area 16 that is larger than the respective utilized sensor area of the segmented pixel sensor 15 is used. The shape of the illumination area 16 could differ (e.g. squared, round, etc.). Provided are activated pixels 5a, deactivated pixels 5b, and deactivated sub-pixels that are arranged between activated and/or deactivated pixels. Those pixels (e.g., comprising a 4×4 area of sub-pixels) that are fully within the sensor area of the segmented pixel sensor 15 are activated, whereas those pixels that are only partially within the sensor area as of result of extending beyond the sensor area of the segmented pixel sensor 15 are deactivated. The pixels, including activated and deactivated pixels, move within the sensor area in order to follow the trajectory of the projected field-of-view or scenery (i.e., the trajectory of the transmitted laser beam(s)). The spatial orientation of the pixels with respect to each other remains fixed. Thus, as deactivated pixels move fully within the sensor area, they are activated. Similarly, as activated pixels move fully or partially out of the sensor area, they are deactivated.

If a high number of pixels are simultaneously active, the missing pixels at the borders will cause little impact on illumination efficiency. For example, a 4×4 pixel area needs an illumination area of 5×5 pixels and will lead to an illumination efficiency of 64%.

Figure 5A:
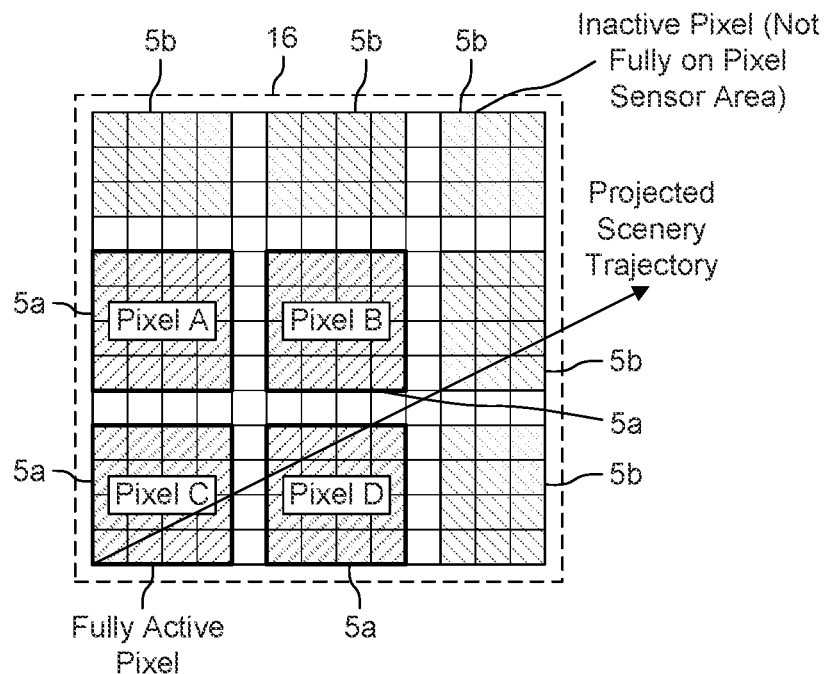
FIGS. 5A-5D illustrate a dynamic formation of pixels that move across a segmented pixel sensor according to one or more embodiments.

In FIG. 5A, pixels A, B, C, and D are activated. Pixels E and F (not illustrated) are located completely out of the sensor area.

Figure 5B:
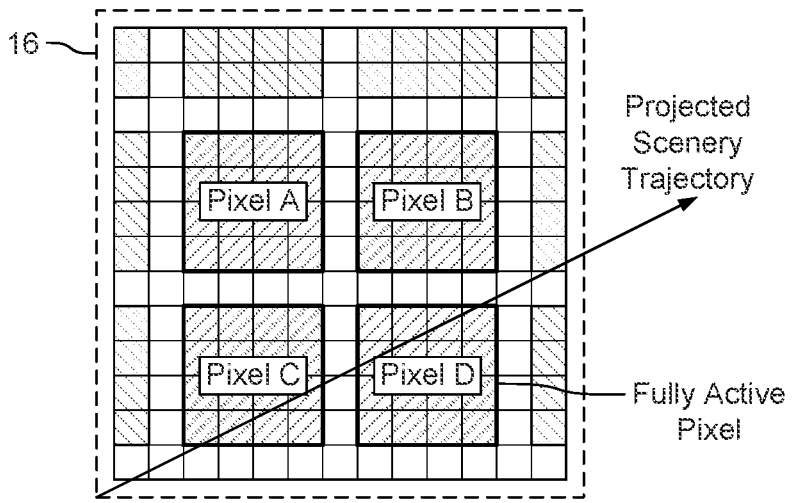

In FIG. 5B, pixels A, B, C, and D are moved in the direction of the projected scenery trajectory. Because they remain fully within the sensor area, they remain activated. Due to the movement of the pixel arrangement as a whole, pixels E and F are moved partially into the sensor area but remain deactivated.

Figure 5C:
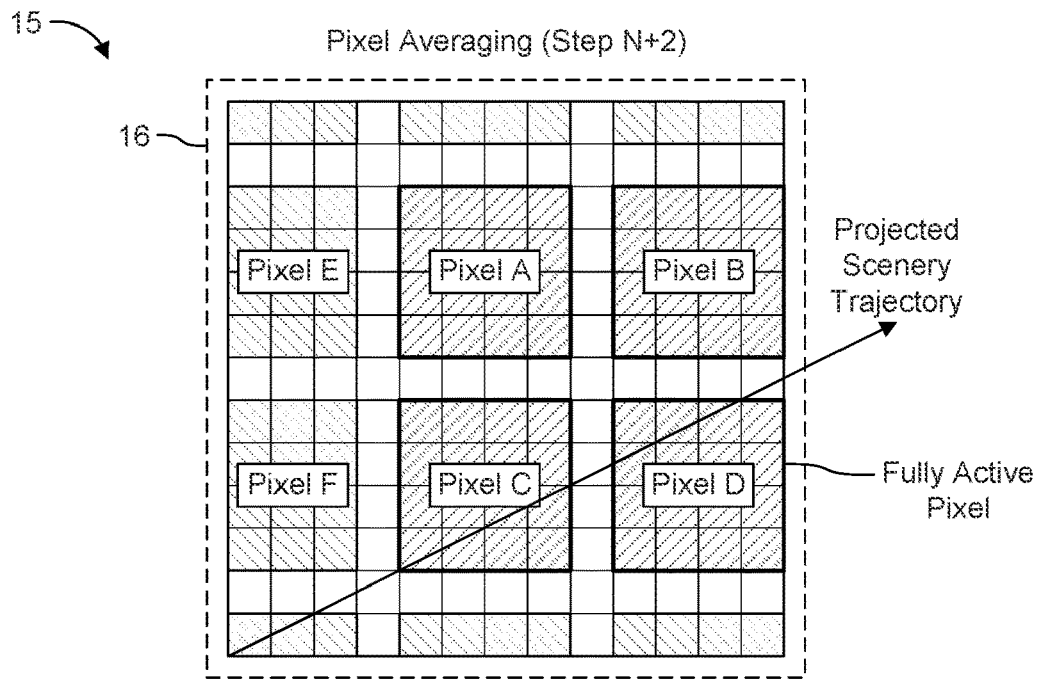

In FIG. 5C, pixels A, B, C, and D are moved in the direction of the projected scenery trajectory. Because they remain fully within the sensor area, they remain activated. Due to the movement of the pixel arrangement as a whole, pixels E and F are moved further into the sensor area but remain deactivated as they are not fully within the sensor area.

Figure 5D:
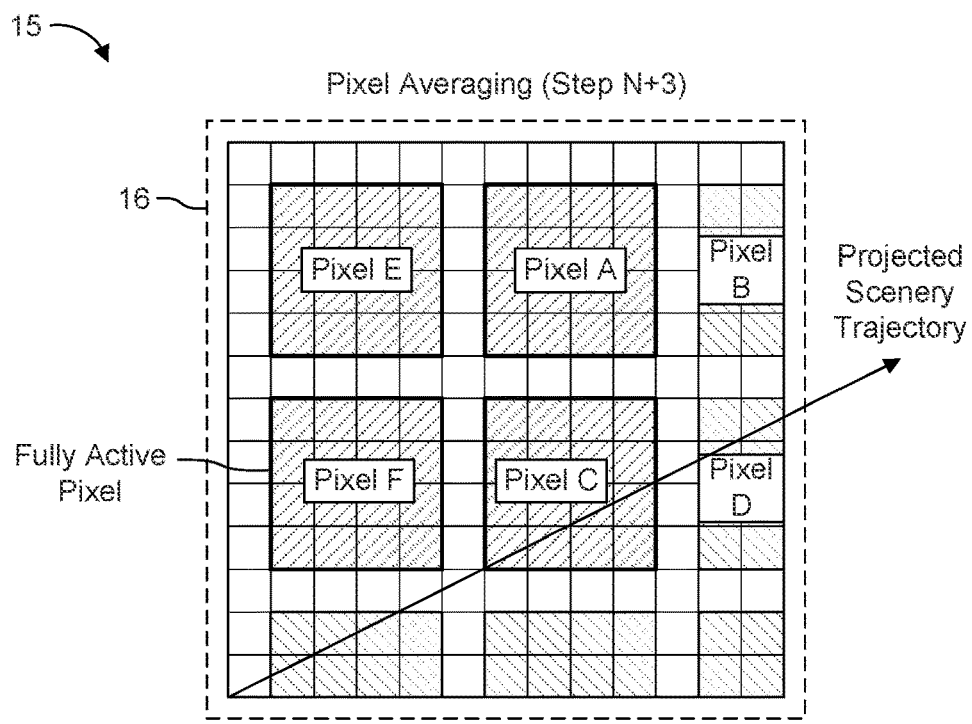

In FIG. 5D, pixels A, B, C, and D are moved in the direction of the projected scenery trajectory. Because pixels A and B remain fully within the sensor area, they remain activated. However, pixels C and D are no longer fully within the sensor area and are deactivated. On the other hand, pixels E and F shift fully within the sensor area and are activated.

Figure 6:
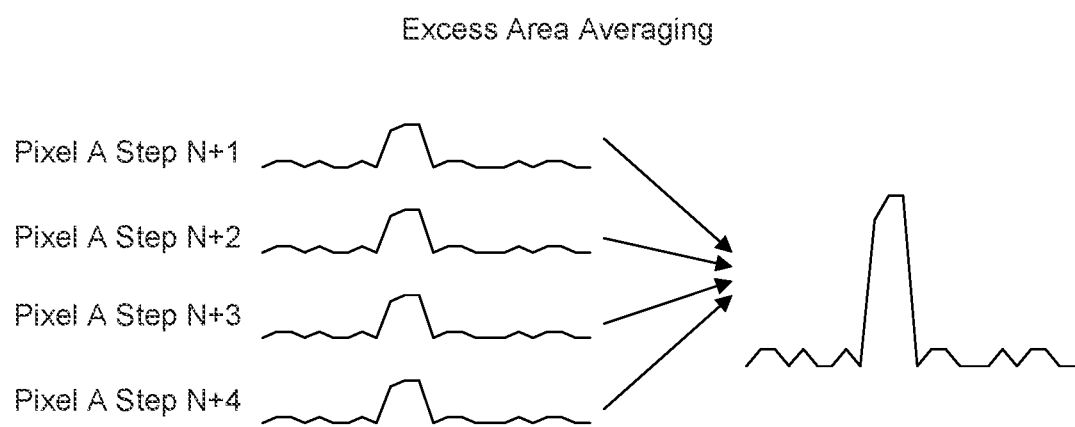
FIG. 6 illustrates pixel averaging of pixel A represented in FIGS. 5A-5D.
Figure 7A:
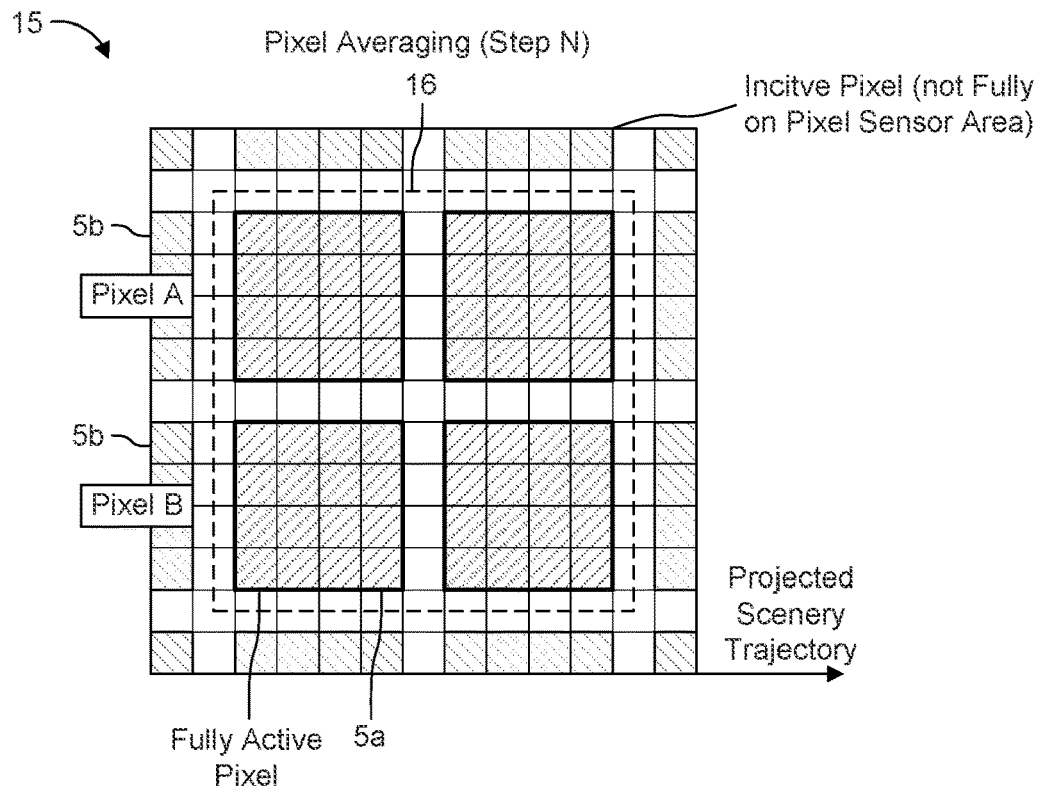
FIGS. 7A-7F illustrate a dynamic formation of pixels that move across a segmented pixel sensor according to one or more embodiments.
Figure 7B:
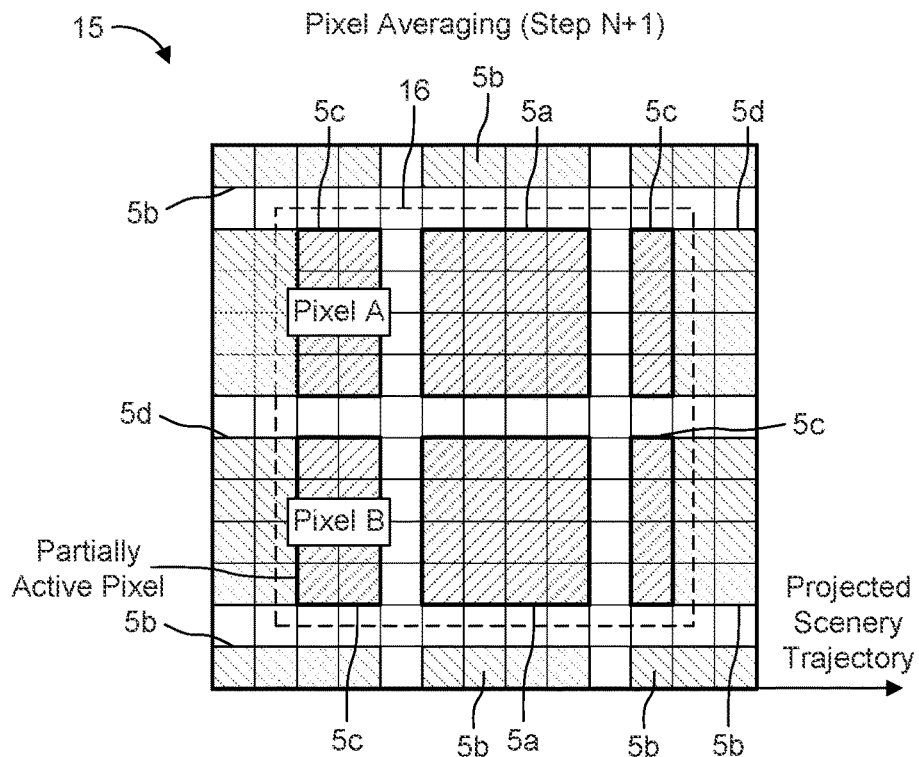
Figure 7C:
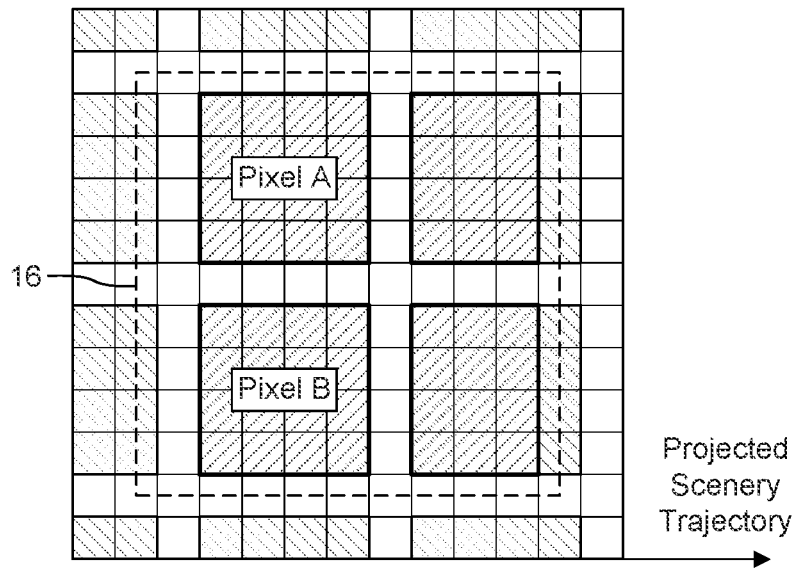
Figure 7D:
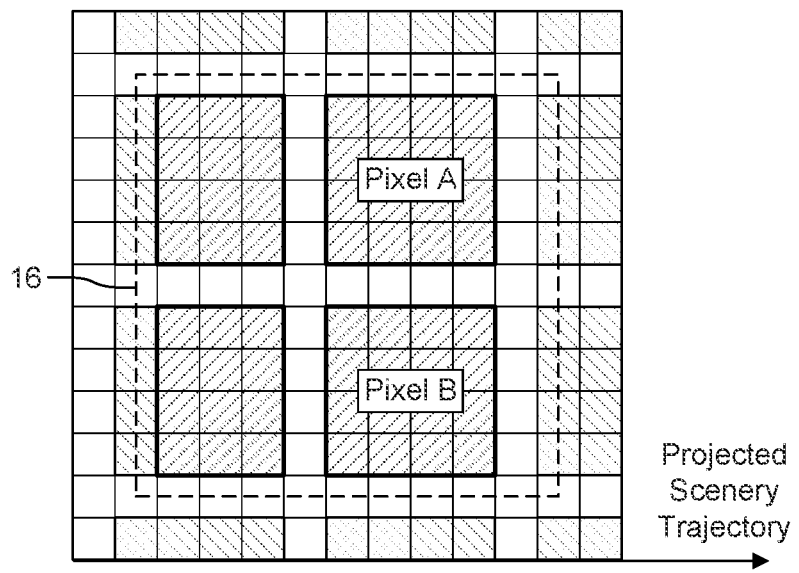
Figure 7E:
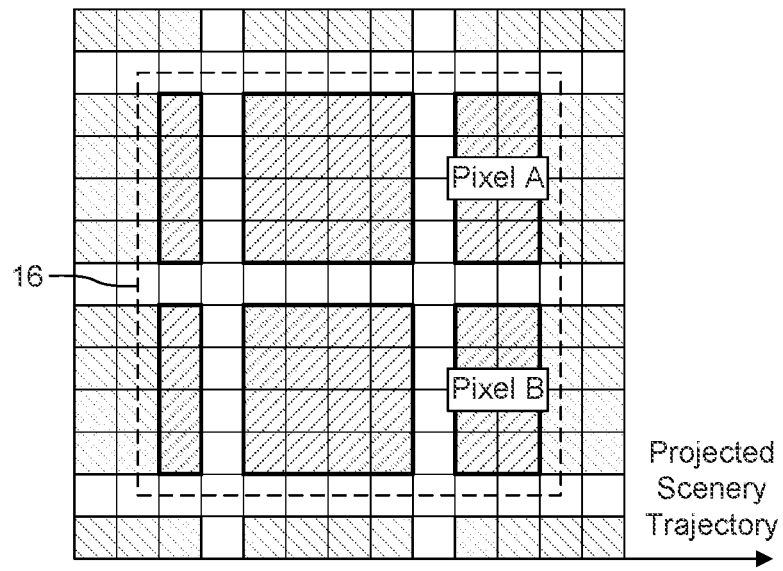
Figure 7F:
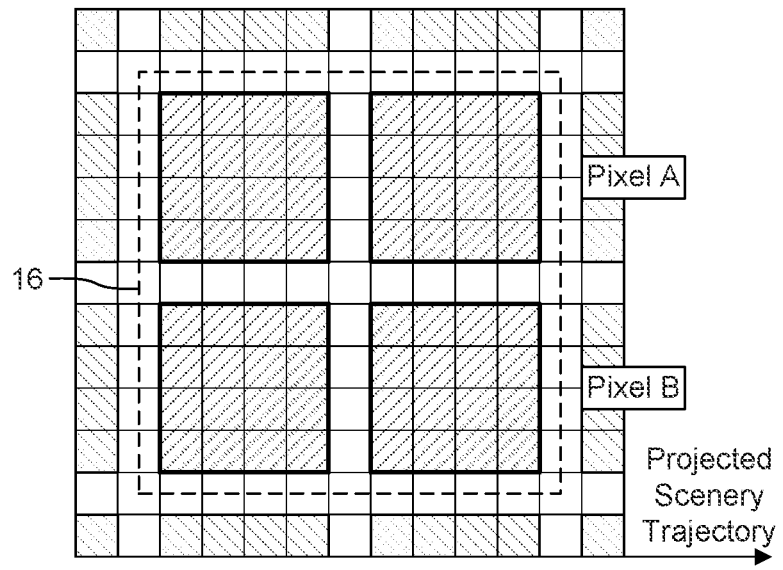

FIG. 6 illustrates pixel averaging of pixel A represented in FIGS. 5A-5D. The system controller 23 receives the pixel measurement signal from pixel A in each of the sequential steps N to N+3 and applies an equally weighed averaging to generate an averaged pixel measurement signal. The same averaging can be applied for each of the pixels A-E to generate averaged pixel data for each of the pixels across multiple frames.

FIGS. 7A-7F illustrate a dynamic formation of pixels that move across a segmented pixel sensor according to one or more embodiments. Like FIGS. 5A-5D, FIGS. 7A-7F represent a sequential order of laser shooting events of a Lissajous scanning operation. Here, six steps N to N+5 of six consecutive laser transmissions are shown. Here, the illumination area 16 matches with pixel area of the segmented pixel sensor 15 with pixels being partially averaged to achieve higher efficiency, especially of illumination with low number of pixels in illuminated area). In this case, portions of pixels 5a and 5c that are within the illumination area are activated, whereas as pixels 5b or portions of pixels 5d that are located outside of the illumination area are deactivated.

Again, formed pixels follow the movement of the projected scenery trajectory across the sequential steps (i.e., sequential frames).

Figure 8:
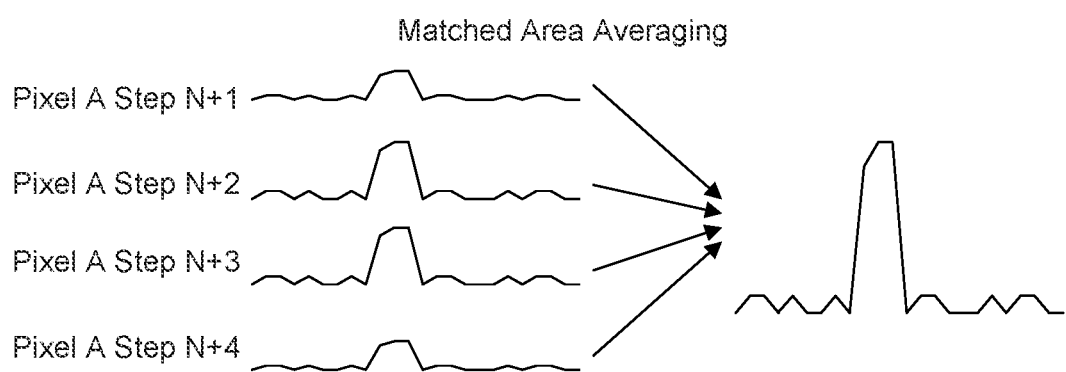
FIG. 8 illustrates pixel averaging of pixel A represented in FIGS. 7A-7F.
Figure 9A:
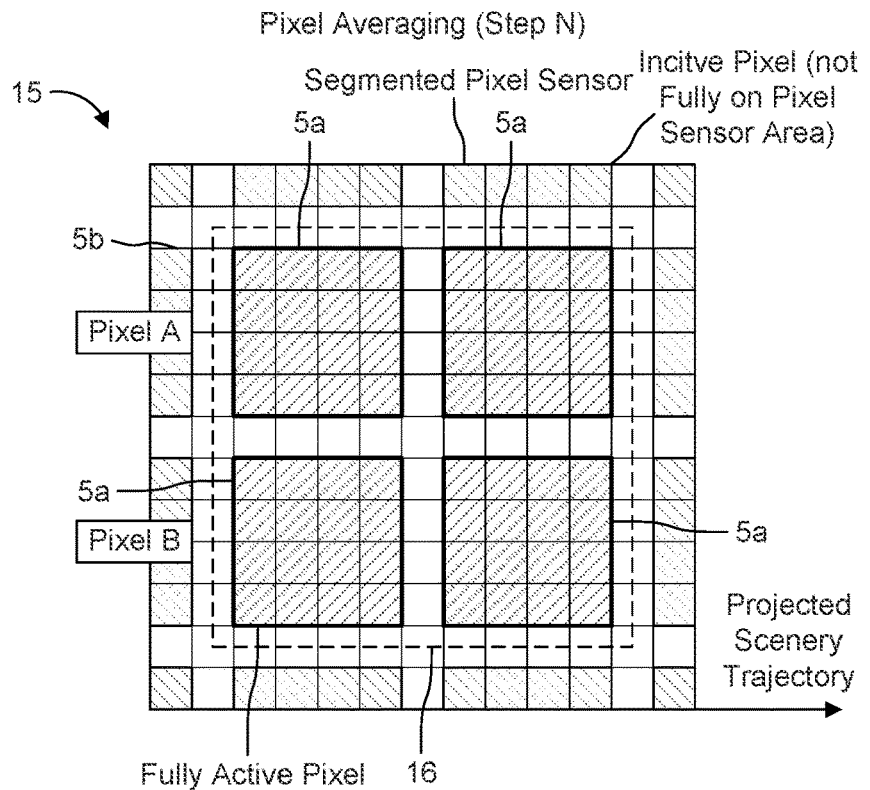
FIGS. 9A-9D illustrate a dynamic formation of pixels that move across a segmented pixel sensor according to one or more embodiments.
Figure 9B:
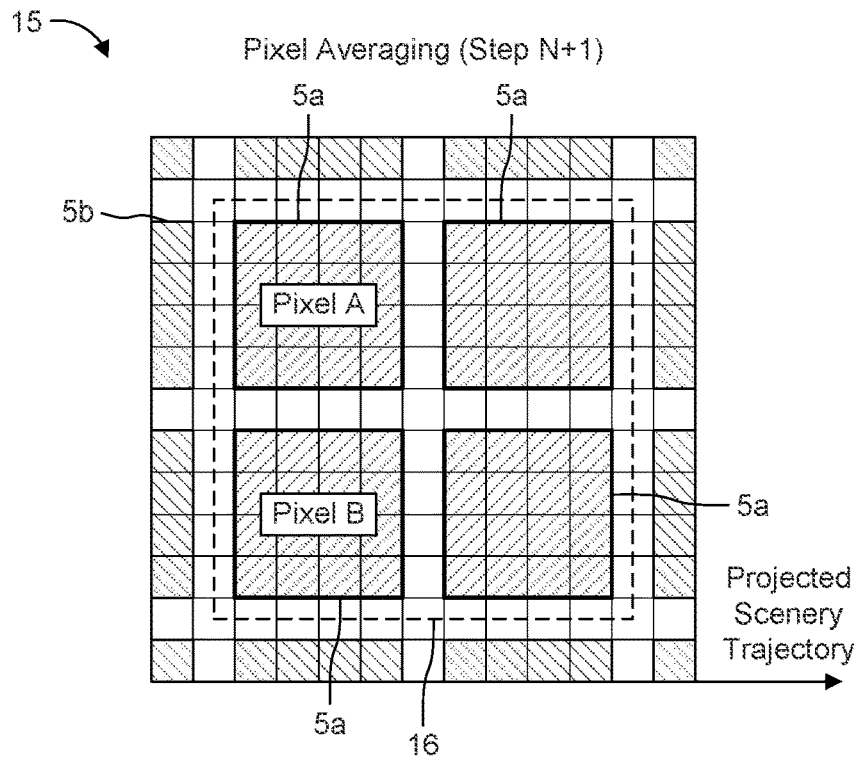
Figure 9C:
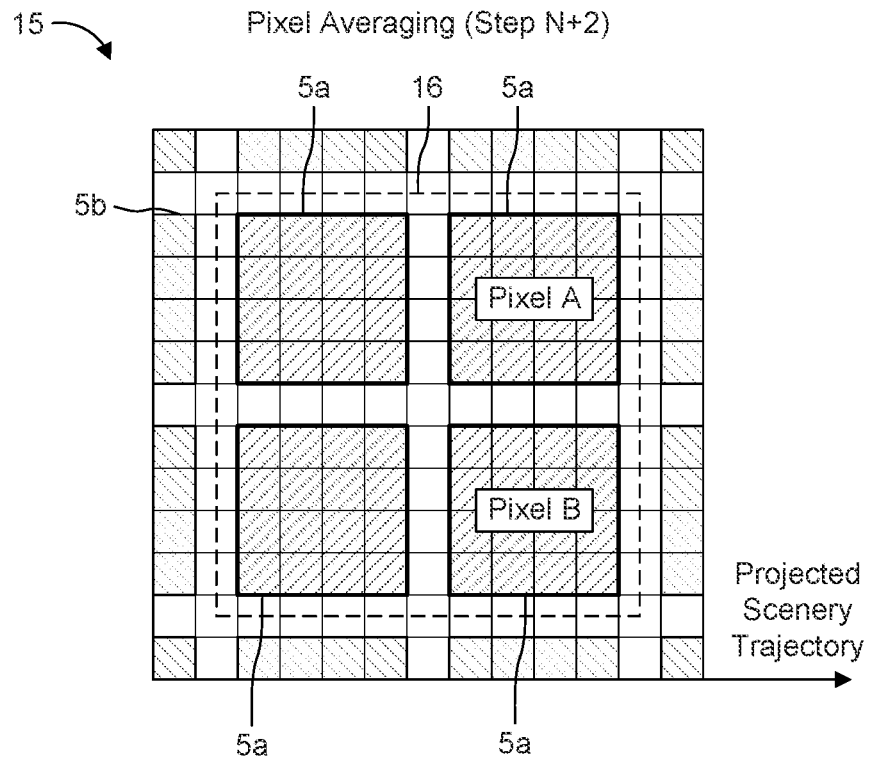
Figure 9D:
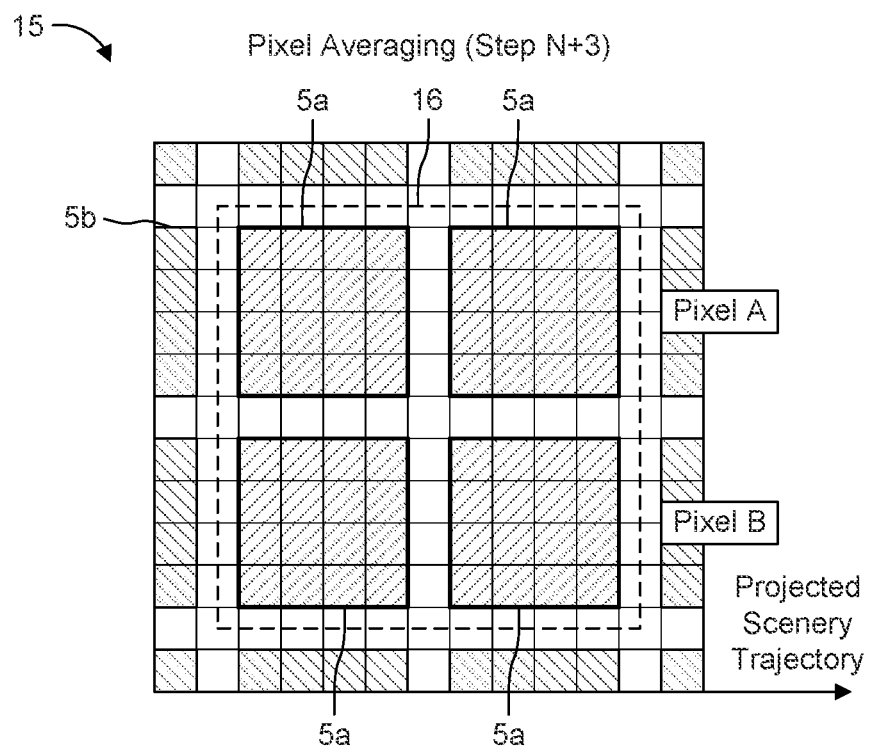

FIG. 8 illustrates pixel averaging of pixel A represented in FIGS. 7A-7F. Here, pixel A or a portion thereof is only activated during steps N+1, N+2, N+3, and N+4. Thus, an average pixel measurement signal for pixel A is generated from pixel measurement signals acquired from pixel A for those four steps. The averaging algorithm can weight all pixels that are at least partially represented on segmented pixel sensor 15 with their respective activated area (i.e., according to a number of activated sub-pixels for a given pixel). The averaging algorithm can weight pixels according to their illumination area. If a pixel is only illuminated 50% (i.e., 50% of the pixel's sub-pixels are activated) then the weighing algorithm considers this fact mathematically in the averaging. For example, a pixel that is 50% illuminated in one step may be assigned half the weight of a fully activated pixel.

FIGS. 9A-9D illustrate a dynamic formation of pixels that move across a segmented pixel sensor according to one or more embodiments. Like FIGS. 5A-5D, FIGS. 9A-9D represent a sequential order of laser shooting events of a Lissajous scanning operation. Here, four steps N to N+3 of four consecutive laser transmissions are shown. Here, the illumination area 16 matches with the pixel area of the segmented pixel sensor 15. In this case, whole pixels that are within the illumination area are activated, whereas pixels that are located outside of the illumination area are deactivated. The time between laser shoots is exactly the time to move an integer number N of pixels. For, example, N=1 and 2× averaging may be used for every pixel.

Again, formed pixels follow the movement of the projected scenery trajectory across the sequential steps (i.e., sequential frames).

Figure 10:
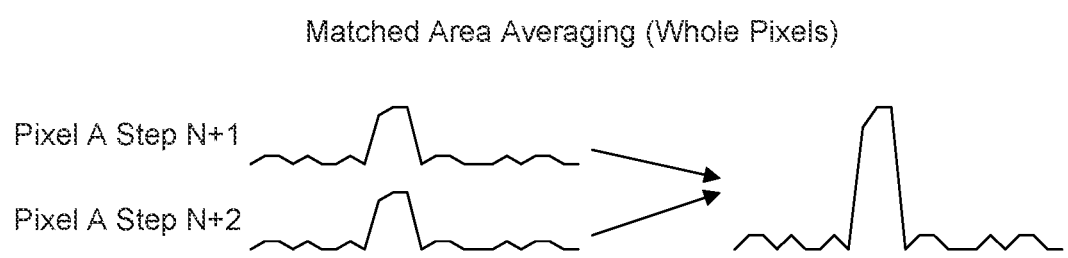
FIG. 10 illustrates pixel averaging of pixel A represented in FIGS. 9A-9D. The averaging algorithm weighs whole pixels only.

FIG. 10 illustrates pixel averaging of pixel A represented in FIGS. 9A-9D. The averaging algorithm weighs whole pixels only. In this case, pixel A is present within the illumination area in steps N+1 and N+2 only and an average pixel measurement signal for pixel A is generated from pixel measurement signal acquired from pixel A in these two steps.

In addition, a smaller illumination area than the respective utilized sensor area may be used. Given, are pixels at the edge of the utilized sensor area and a typical laser supporting a non-rectangular illumination profile with no sharp laser light edges. In this case, at the edges of the illumination area, the pixels fetch only fractions of the laser light. As a consequence, SNR is reduced at these pixels. Nevertheless, the partly covered pixel and its pixel information can be used for averaging for example in a weighted way in order to improve the overall laser light efficiency.

Figure 11A:
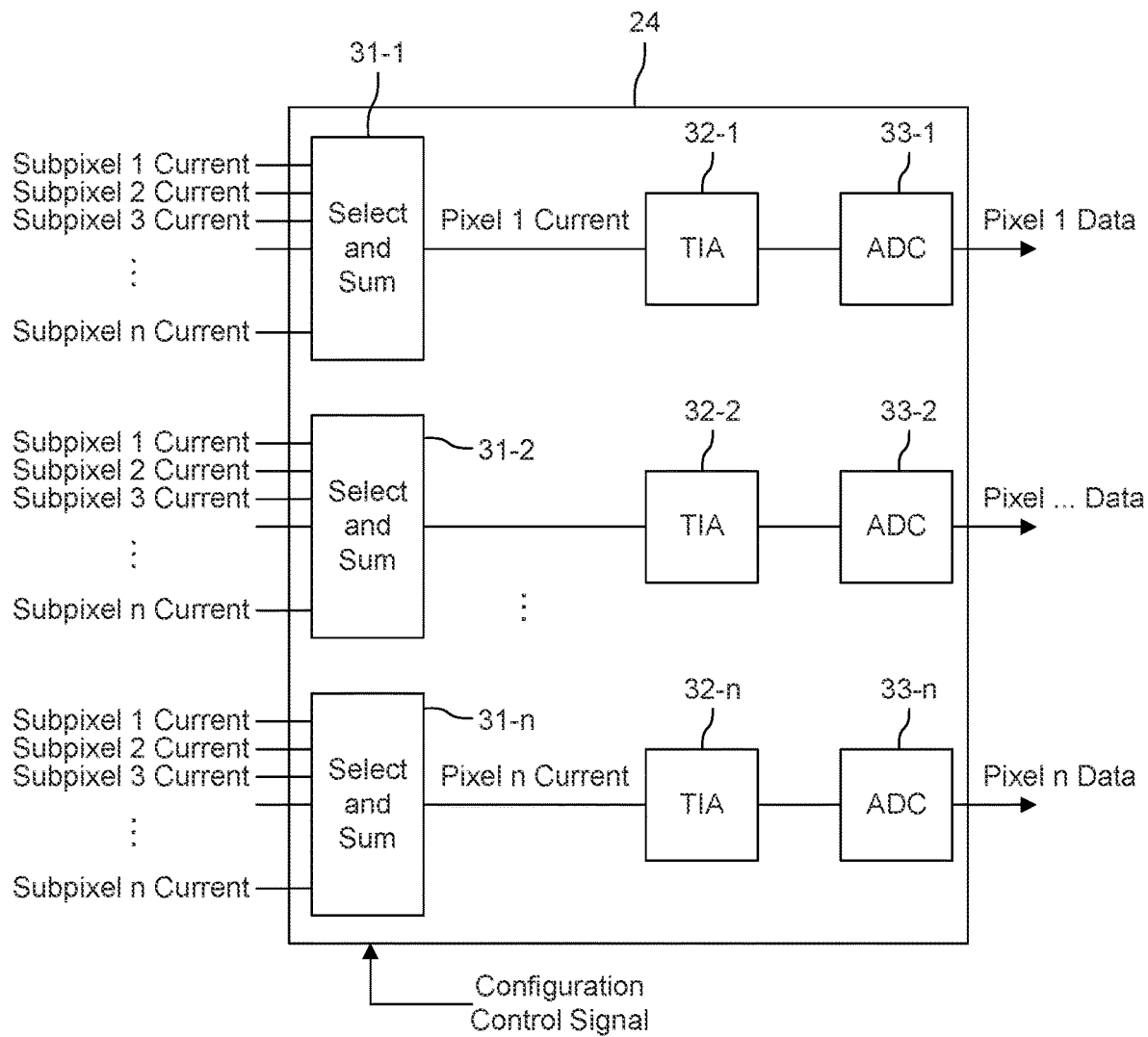
FIGS. 11A and 11B show schematic block diagrams of a receiver circuit according to one or more embodiments.
Figure 11B:
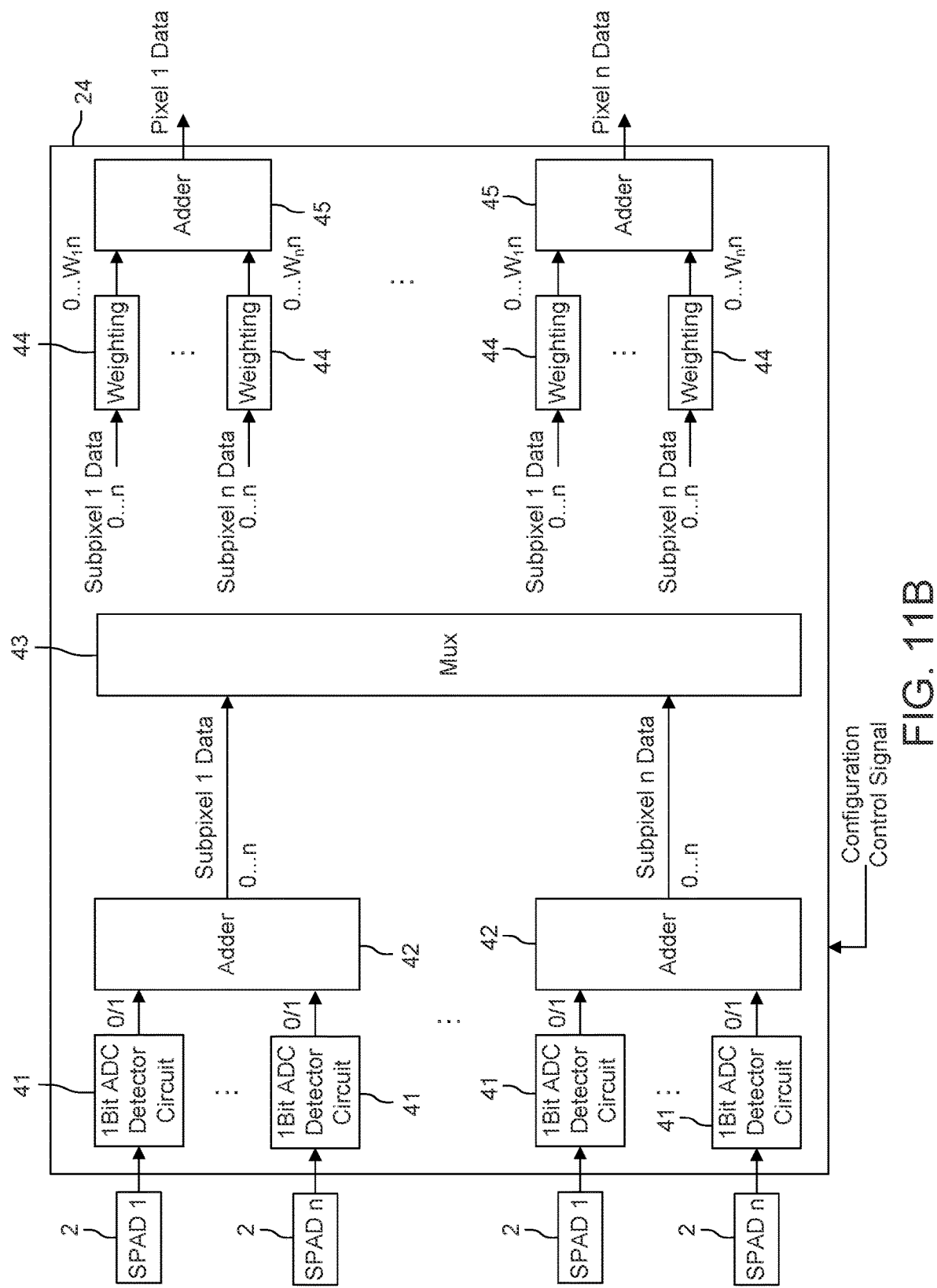

FIGS. 11A and 11B show schematic block diagrams of a receiver circuit 24 according to one or more embodiments. In particular, FIG. 11A is directed to analog pixel multiplexing and data conversion, whereas FIG. 11B is directed to digital pixel multiplexing and pixel data computation. In each case, the receiver circuit 24 is selectively coupled to sub-pixels 1 according to configuration control signals received from the system controller 23. The configuration control signals provide sub-sub-pixel and sub-pixel clustering information for selectively grouping sub-sub-pixels into sub-pixels and for selectively grouping sub-pixels into pixels.

In FIG. 11A, the sum of electrical signals (e.g., currents) from each sub-sub-pixel of a respective sub-pixel is received as a sub-pixel current. The sub-pixel currents are received at selected select and sum circuits 31-1, 31-2, . . . , and 31-n, each corresponding to an assigned pixel based on sub-pixel clustering information. Thus, the sub-pixel currents are grouped into assigned pixels based on their assignment to a particular select and sum circuits 31-1, 31-2, . . . , and 31-n. Additional multiplexers and summing circuits (not illustrated) may be used for grouping and summing sub-sub-pixels into sub-pixel currents based on sub-sub-pixel clustering information and directing the sub-pixel currents to assigned select and sum circuits 31-1, 31-2, . . . , and 31-n according to the sub-pixel clustering information.

Each select and sum circuits 31-1, 31-2, . . . , and 31-n selects which sub-pixel currents to add among those received and applies a summing algorithm to sum the selected sub-pixels current together to generate a pixel current for the corresponding pixel. The respective pixel currents are transmitted to a respective transimpedance amplifier (TIA) 32-1, 32-2, . . . , and 32-n, which converts the pixel current into a voltage signal. The voltage signal is then provided to a respective ADC 33-1, 33-2, . . . , and 33-n, which converts the analog voltage signal into a digital signal. The digital signal is then transmitted on a readout channel as pixel data from the receiver circuit 24 to the system controller 23 for further processing.

In FIG. 11B, sub-sub-pixels (e.g., SPADs) provide sub-sub pixel signals (e.g., currents) to a corresponding 1-bit ADC detector circuit 41. That is, each sub-sub-pixel is electrically coupled to its own 1-bit ADC detector circuit 41. The 1-bit ADC detector circuit 41 detects whether or not a sub-sub pixel is received or not and outputs a binary signal (i.e., either a 1 or a 0) based on the detection. Thus, the binary signal is a digital sub-sub-pixel signal. Such a detection can be synchronized with all the 1-bit ADC detector circuits 41 based on a clock signal.

The digital sub-sub-pixel signals are provided to assigned adders 42 based on the sub-sub-pixel clustering information. In particular, each of the adders 42 correspond to a different digital SiPM and generates sub-pixel data for that SiPM by adding the digital sub-sub-pixel signals together. A multiplexer (not illustrated) may be used for directing the digital sub-sub-pixel signals to their assigned adders 42. Each adder 42 corresponds to a different sub-pixel and is configured to add the received digital sub-sub-pixel signals into subpixel data for its corresponding sub-pixel. A multiplexer 43 receives the subpixel data for each sub-pixel and directs the subpixel data to assigned pixel circuitry according to sub-pixel clustering information.

The pixel circuitry includes a weighting circuit 44 and an adder 45. Each weighting circuit 44 applies an assigned weight (e.g., 0 to Wn) according to one of the aforementioned weighting schemes (e.g., equal weighting as shown in FIGS. 6 and 10, pixel weighting as shown in FIG. 8, etc.). The configuration control signals may provide the weighting information for programming the weighting circuits 44.

Each adder 45 receives the weighted subpixel data from its corresponding weighting circuits 44 and adds the weighted subpixel data to generate pixel data for its corresponding pixel. The digital pixel signal is then transmitted on a readout channel as pixel data from the receiver circuit 24 to the system controller 23 for further processing.

Only the mirror position at the time of the laser shot is relevant for illuminating a particular area of the field-of-view. While a laser pulse is usually very short (ones of ns) and thus is not affected by the continuous mirror movement, the mirror position at which time received light is received varies based on the time-of-flight. That is, the position of the receiver mirror may be at a different angle depending when a reflected light beam is received. Thus, the position of the illuminated area on the segmented pixel sensor 15 may change based on the time-of-flight due to the continuous mirror movement. In other words, the scenery representation on the segmented pixel sensor 15 depends on the time delay (up to ones of us) and the mirror speed.

Short and long distanced objects in the way of reflected laser light will appear at different positions on the segmented pixel sensor 15. The adaptive pixel clustering can also be used to compensate for this effect.

Figure 12A:
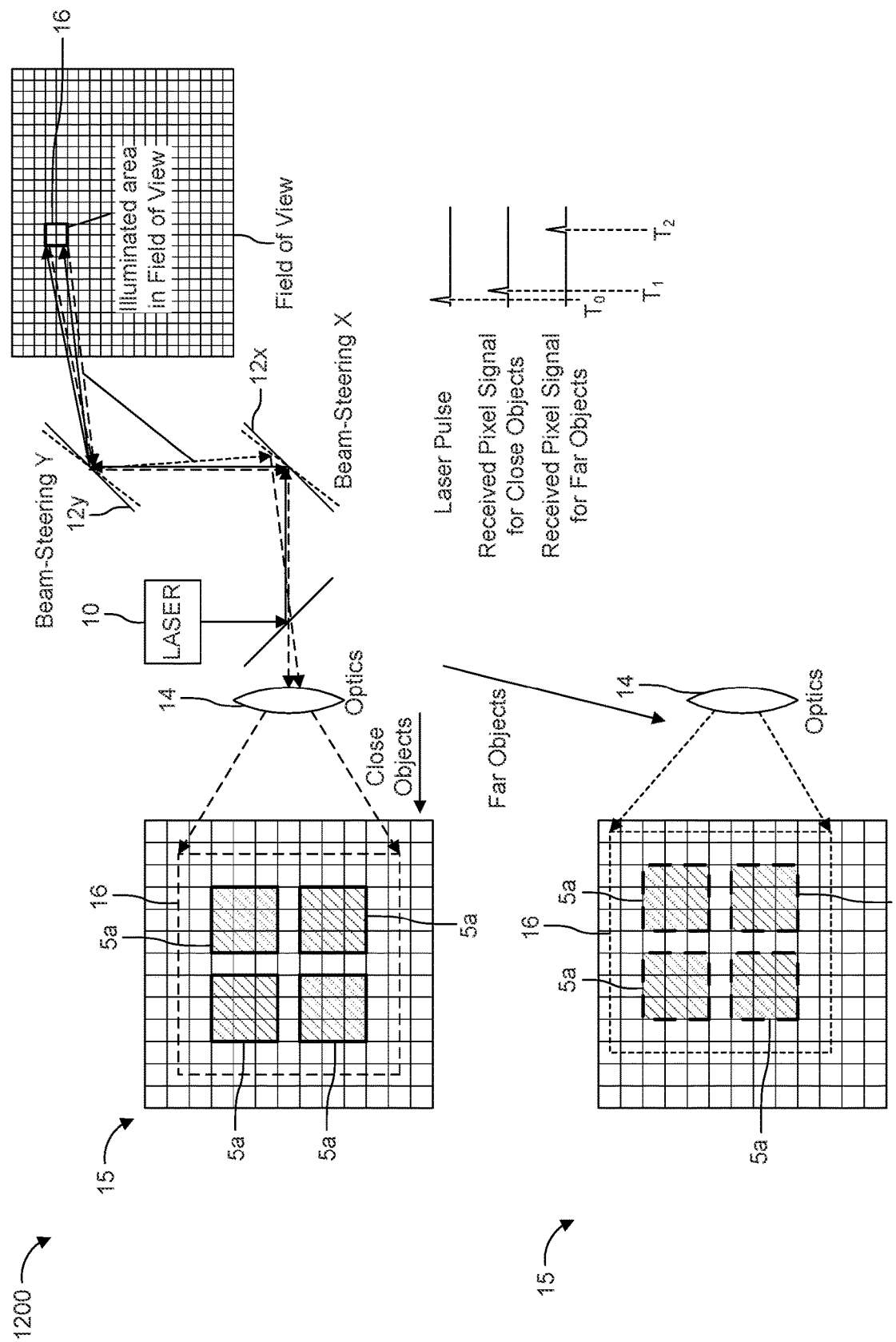
FIG. 12A is a schematic diagram of a Lissajous LIDAR scanning system according to one or more embodiments.
Figure 12B:
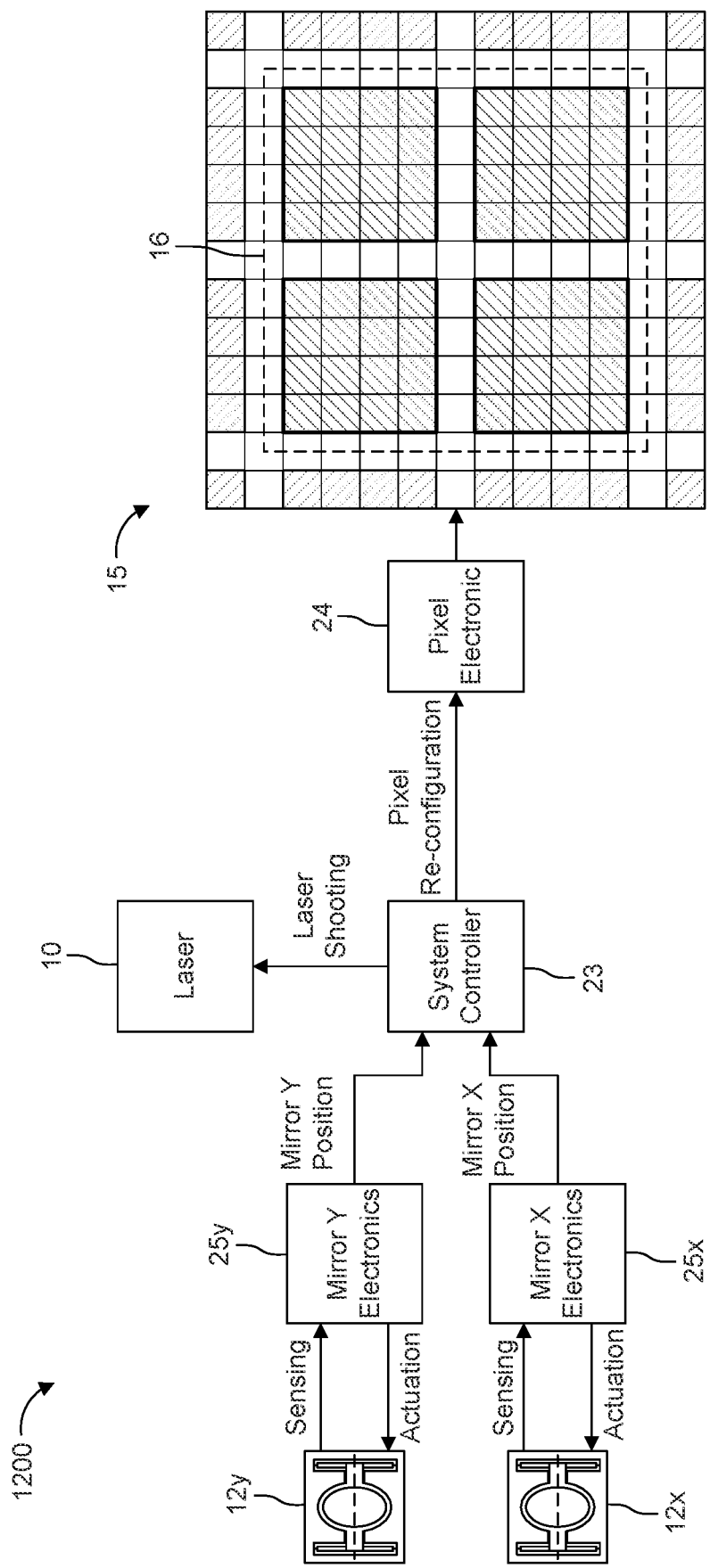
FIG. 12B is a schematic block diagram of the Lissajous LIDAR scanning system, including additional circuitry similar to that shown in FIG. 2.

FIG. 12A is a schematic diagram of a Lissajous LIDAR scanning system 1200 according to one or more embodiments. FIG. 12B is a schematic block diagram of the Lissajous LIDAR scanning system 1200, including additional circuitry similar to that shown in FIG. 2.

The Lissajous LIDAR scanning system 1200 includes a first 1D MEMS mirror 12y that performs beam-steering in the y-direction and a second 1D MEMS mirror 12x that performs beam-steering in the x-direction. The two MEMS mirrors make up a 2×1D mirror scanning system for scanning a field-of-view. Both mirrors are used for transmitting and receiving light beams. In addition, the Lissajous LIDAR scanning system 1200 includes illumination unit 10, optics 14, and segmented pixel sensor 15.

FIG. 12A illustrates how short and long distanced objects appear at different positions on the segmented pixel sensor 15, where close objects (short time-of-flight) are projected via reflected laser light onto one area of the segmented pixel sensor 15 and further objects (longer time-of-flight) are projected via reflected laser light onto another area of the segmented pixel sensor 15 due to the difference in rotation position of the continuously oscillating MEMS mirrors 12x and 12y.

The MEMS drivers 25y and 25x not only drive the oscillation of their respective MEMS mirrors 12y and 12x, but also sense their rotational positions (i.e., angular positions or tilt angles) about their rotational axis. The position information of each mirror is provided to the system controller 23. The system controller 23 uses the position information of each mirror to anticipate a projection area 16 of the received light beam onto segmented pixel sensor 15.

The rotational positions of the mirrors 12y and 12x continue to change as the time-of-flight increases. Thus, the projection area 16 may start at a starting area based on the rotational positions of the mirrors 12y and 12x at the time a light beam is transmitted by the illumination unit 10 (i.e., time T0). The projection area 16 changes with the changing rotational positions of the mirrors 12y and 12x, and deviates further from the starting position as the time-of-flight increases. A short time-of-flight may correspond to time T1, whereas a longer time-of-flight may correspond to time T2.

As the projection area 16 changes, the system controller 23 changes the pixel position of the active pixels 5a to remain within the expected projection area 16. In this example, the active pixels 5a remain centered within the expected projection area 16. In order to change the pixel position of the active pixels 5a, the system controller 23 updates sub-sub-pixel and sub-pixel clustering information and transmits the updated configuration control signals to the receiver circuit 24. In response to the updated the configuration control signals, the receiver circuit 24 changes the sub-sub-pixel and sub-pixel clustering to change the position of the active pixels 5a while deactivating the remaining sub-sub-pixels. FIGS. 5A-5D illustrate one example of changing pixel positions based on expected trajectory of the received laser light and is similarly applicable to compensating for mirror movement during the time-of-flight.

Thus, after the laser beam is shot, the active pixel position follows the projection on the pixel sensor 15 to compensate the mirror movement during the time-of-flight. This compensation technique is of particular importance for long-ranged objects and very fast (kHz) moving mirrors.

For example, the pixel position that can change with subpixel resolution can be moved to best fit to expected projection at any time (x and y movement could be different and needs switching at different times). For example, a field-of-view x*y=60° *60°, 120 pixels in x direction, pixel size represents 0.5° and consists of 4×4 subpixel (1 subpixel)–0.125°, laser moves with 0.25°/us in x direction and 0.2°/us in y direction leads to moving a pixel by 1 subpixel in x direction every 0.5 us and 1 subpixel in y direction every 0.625 us to compensate a moving of projection on pixel sensor 15.

It is noted that due to different gains of the sub-pixels, switching between sub-pixels can potentially lead to a step in the received signal during the reception of a single laser shoot response (pixel signal). However, this is uncritical as a symmetric filter (i.e., a matched filter) can be used to suppress this step.

For a pulsed laser beam (i.e., pulse-train LiDAR), the LIDAR scanning system may shoot the laser when the moving/oscillating MEMS mirrors 12y and 12x reach their desired positions. The desired positions are reached when the illuminated area in the field-of-view coincides with the active pixel positions within a subpixel resolution.

Alternatively, for a pulsed laser beam, the LIDAR scanning system may shoot at an arbitrary time and dynamically adapt the pixel clustering in such a way that the illuminated area in the field-of-view coincides as close as possible with active pixel position within a subpixel resolution.

Alternatively, for FMCW LIDAR and pulse-train LiDAR, the LIDAR scanning system may dynamically adapt the active pixel positions according to the light beam that is steered and moved over the field-of-view, as illustrated for example in FIGS. 5A-5D.

The aforementioned techniques of pixel position compensation for fast consecutive laser shooting and averaging or time-of-flight mirror movement can be used separately or combined. In one possible embodiment, the two techniques can be combined. In this embodiment, after the laser pulse is shot, the pixel position moves to compensate the mirror movement during the time-of-flight. When a reception phase of a laser shot is finished, including signal averaging, the laser pulse can be shot again starting with new pixel position. Thereby, the reception phase as well as the time for the mirror to move by one pixel could coincide with the laser shoot repetition rate of the illumination unit 10.

Figure 13A:
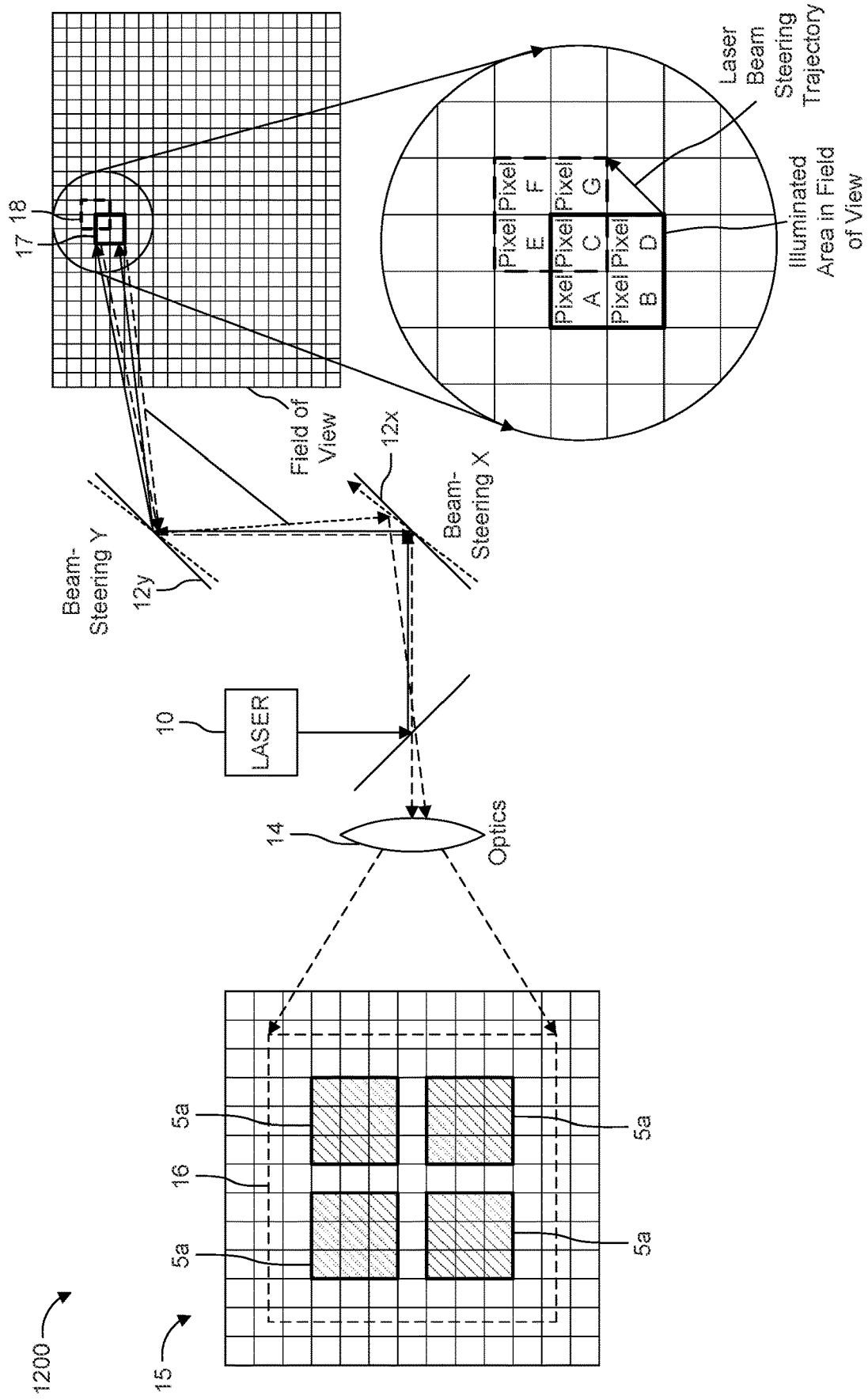
FIG. 13A is a schematic diagram of the Lissajous LIDAR scanning system shown in FIG. 12A but additionally shows two consecutive laser shots into the field-of-view.

FIG. 13A is a schematic diagram of the Lissajous LIDAR scanning system 1200 shown in FIG. 12A but additionally shows two consecutive laser shots 17 and 18 into the field-of-view. The two consecutive laser shots 17 and 18 may correspond to any two consecutive steps noted above (e.g., N and N+1, N+1 and N+2, etc.). However, for the purposes of this example, the two consecutive laser shots 17 and 18 correspond to steps N and N+1. As can be seen in the field-of-view, the two consecutive laser shots 17 and 18 overlap by a pixel. In this case, pixel C is shared by the two consecutive laser shots 17 and 18. In other words, pixel C will be active on the segmented pixel sensor 15 for both laser shots 17 and 18.

Figure 13B:
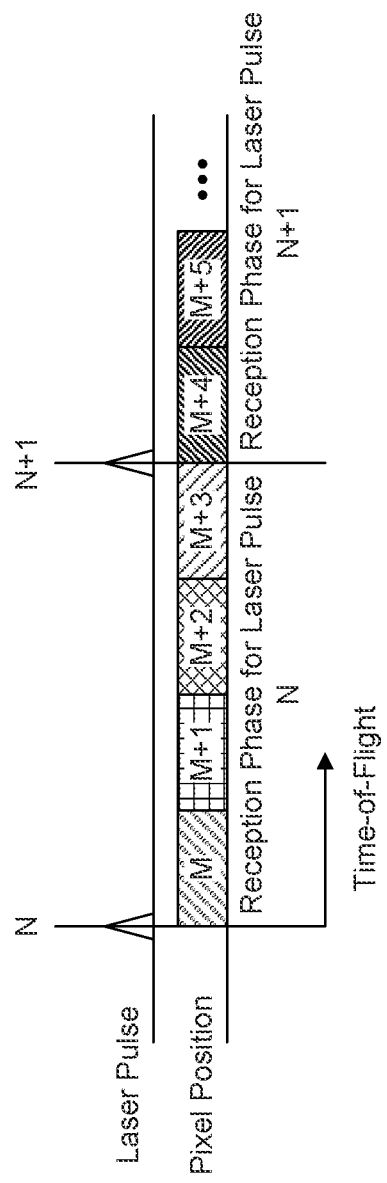
FIGS. 13B and 13C shows different possible pixel positions at which laser shots may be received on the segmented pixel sensor based on a time-of-flight of each laser shot.
Figure 13C:
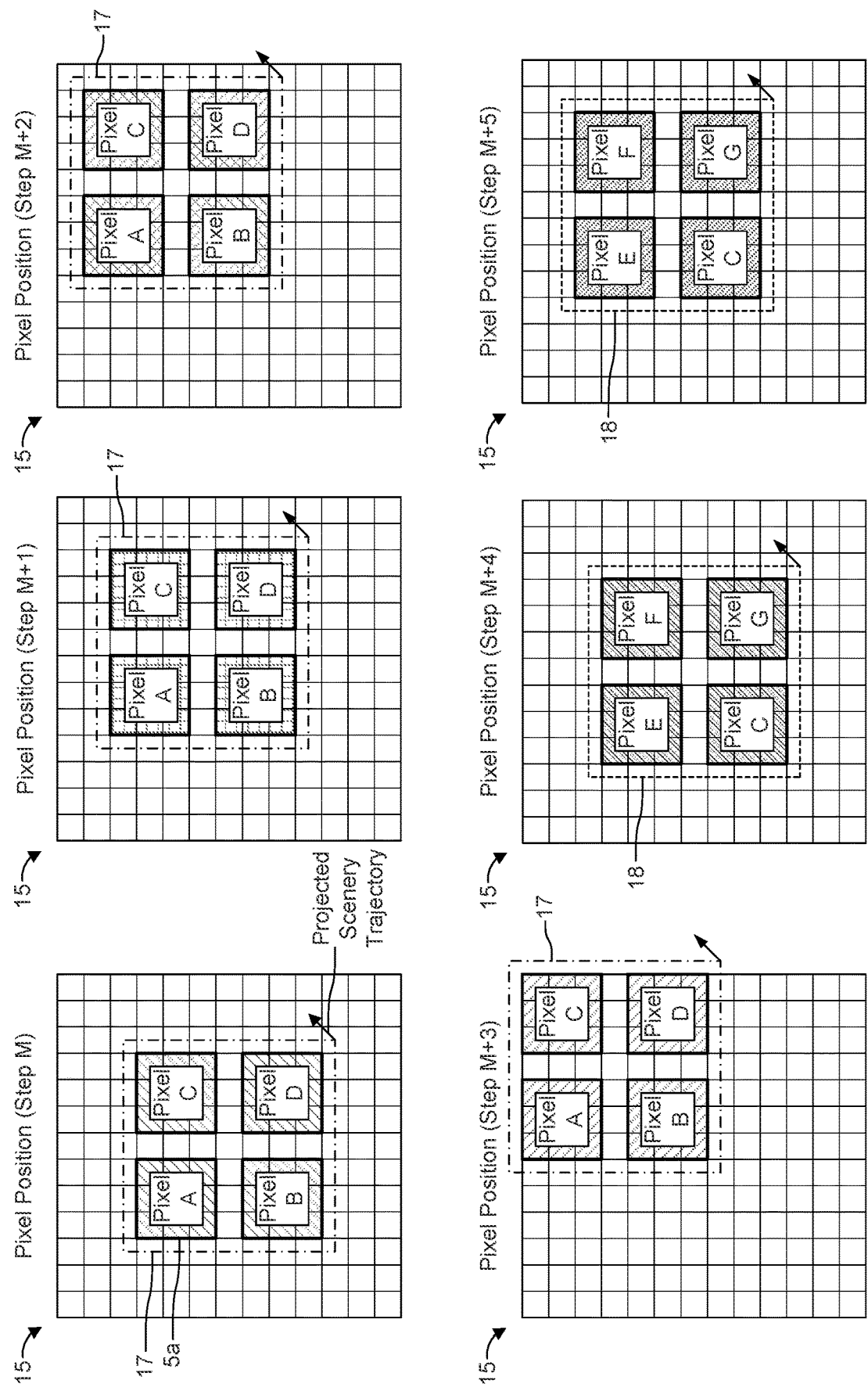

FIGS. 13B and 13C shows different possible pixel positions at which laser shots 17 and 18 may be received on the segmented pixel sensor 15 based on a time-of-flight of each laser shot 17 and 19, or, more particularly, based on the change in position of the MEMS mirrors 12$y$ and 12$x$ based on the time-of-flight of the laser shots 17 and 18. FIG. 13B shows different reception phases each sequentially corresponding to a range of longer time-of-flight times and different range of mirror positions. FIG. 13C shows the movement or change in position of active pixels according to the current reception phase that changes as the time-of-flight increases according to FIG. 13B.

Laser shot 17, for instance, may be received in one of four preconfigured reception phases M, M+1, M+2, and M+3, each sequentially corresponding to a range of longer time-of-flight times and different range of mirror positions. M is an integer. Each of the preconfigured reception phases M, M+1, M+2, and M+3 is assigned different pixel positions for active pixels A, B, C and D for receiving laser shot 17. As the time-of-flight progresses through the different reception phases, the system controller 23 updates the sub-sub-pixel and sub-pixel clustering information to change the pixel positions to adapt to the current reception phase.

In other words, the one or more pixels is selectively activated in one of a plurality of discrete areas of the pixel area. Each discrete area is assigned to a different one of a plurality of positional ranges of the MEMS mirror(s) 12. For example, reception phase M corresponds to a first range of time-of-flight times (i.e., a first time period) that corresponds to a first positional range of angle positions or rotation positions of the MEMS mirror(s) 12. The first positional range is a range of angle positions the MEMS mirror(s) 12 is expected to traverse from the start of reception phase M to the end of reception phase M. Thus, the projection of received laser light deflected from the MEMS mirror(s) 12 onto segmented pixel sensor 15 can be expected in a first discrete area of the pixel area. As such, the one or more pixels are activated within this first discrete area during the reception phase M.

If laser light is not received in reception phase M, the system progresses to reception phase M+1. Reception phase M+1 corresponds to a second range of time-of-flight times (i.e., a second time period) that corresponds to a second positional range of angle positions or rotation positions of the MEMS mirror(s) 12. The second positional range is a range of angle positions the MEMS mirror(s) 12 is expected to traverse from the start of reception phase M+1 to the end of reception phase M+1. Thus, the projection of received light deflected from the MEMS mirror(s) 12 onto segmented pixel sensor 15 can be expected in a second discrete area of the pixel area. As such, location of the one or more pixels is changed and are activated within this second discrete area during the reception phase M+1.

If laser light is not received in reception phase M+1, the system progresses to reception phase M+2, and so to M+3 if laser light is not received in reception phase M+2.

At the start of reception phase M+4, the illumination 10 fires laser shot 18, which also has different assigned pixel positions for active pixels C, E, F and G. Similar to laser shot 17, laser shot 18 may be received in one of four preconfigured reception phases M+4, M+5, etc.

The system controller 23 is configured to determine a positional range out of the plurality of positional ranges of the MEMS mirror(s) 12 based on the position information received from the driver(s) 25, and change the clustering of activated sub-pixel elements and the clustering of deactivated sub-pixel elements to form the at least one active pixel based on the determined positional range.

In most practical cases, the time for the mirror to move by one pixel will be higher than the reception phase (also the mirror speed varies, e.g., via sinusoidal mirror movement) and the laser shoot repetition time will also be higher than the reception phase to simplify the post processing (as only one laser pulse will be received in the respective reception phase).

However, in another embodiment, the reception phases could also overlay by having multiple laser pulses in the air for parallel processing of multiple pulses that are shot before reception phase of first laser pulse is over.

In this context a digital SIPM based pixel clustering approach could be useful as it allows the parallel clustering and reception of different but partially overlapping pixels simultaneously. In comparison, analog currents of subpixels cannot be easily summed up to different overlapping pixels.

The embodiments described herein are represented by a receiver structure that uses dynamic pixels clustering for a segmented pixel sensor that dynamically adapts its pixels clustering for non-stationary beam steering. Thus, the pixels follow the projection of the laser beam on the pixel sensor that is steered into the scenery.

Pixel clustering for APDs may come at cost of reduced area efficiency and photon detection efficiency.

Pixel clustering is most likely useful for receiving elements that are already clustered, such as analog and digital SiPMs. In particular digital SiPMs will benefit from pixel clustering because sub-sub-pixel data is digitally available and therefore can be summed up more easily in different clusters.

Although embodiments described herein relate to a LIDAR system, it is to be understood that the foregoing embodiments may be used in other applications and are not limited to LIDAR.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A scanning system, comprising:
    a scanning structure configured to rotate about at least one scanning axis;
    a driver configured to drive the scanning structure about the at least one scanning axis;
    a transmitter configured to transmit a light beam that is directed into a field-of-view by the scanning structure;
    a segmented pixel sensor comprising a plurality of sub-pixel elements arranged in a pixel area; and
    a controller configured to monitor a time-of-flight of the light beam, selectively activate and deactivate the plurality of sub-pixel elements into at least one active cluster and at least one deactivated cluster to form one or more active pixels from the at least one active cluster, and dynamically change a clustering of activated sub-pixel elements and a clustering of deactivated sub-pixel elements based on the time-of-flight of the light beam, wherein the clustering of activated sub-pixel elements and a clustering of deactivated sub-pixel elements changes as the time-of-flight changes between different time-of-flight ranges.

2. The scanning system of claim 1, wherein the controller is configured to change a location of the at least one active cluster and a location of the at least one deactivated cluster within the pixel area with a change in the time-of-flight of the light beam.

3. The scanning system of claim 1, wherein the controller is configured to change a location of the one or more active pixels within the pixel area with a change in the time-of-flight of the light beam.

4. The scanning system of claim 1, wherein:
    the one or more active pixels are selectively activated in one of a plurality of discrete areas of the pixel area, wherein each discrete area of the plurality of discrete areas is assigned to a different one of a plurality of different time-of-flight ranges, and
    the controller is configured to determine a time-of-flight range out of the plurality of different time-of-flight ranges based on the time-of-flight of the light beam, and change the clustering of activated sub-pixel elements and the clustering of deactivated sub-pixel elements to form the one or more active pixels based on the determined time-of-flight range.

5. The scanning system of claim 1, wherein the controller is configured to selectively group sub-pixel elements of the at least one active cluster into a plurality of active pixels.

6. The scanning system of claim 5, wherein the controller is configured to change a location of the plurality of active pixels within the pixel area based on a change in the time-of-flight of the light beam.

7. The scanning system of claim 1, wherein sub-pixel elements of the at least one active cluster are configured to generate electrical signals based on detected light, and sub-pixel elements of the at least one deactivated cluster are deactivated from generating electrical signals based on received light.

8. The scanning system of claim 1, further comprising:
    a readout circuit coupled to the segmented pixel sensor, wherein sub-pixel elements of the at least one active cluster are coupled to the readout circuit, and sub-pixel elements of the at least one deactivated cluster are decoupled from the readout circuit.

9. The scanning system of claim 1, further comprising:
    a readout circuit configured to receive electrical signals from sub-pixel elements of the at least one active cluster, and combine the electrical signals according to the one or more active pixels to generate a pixel signal for each of the one or more active pixels.

10. The scanning system of claim 9, wherein the readout circuit is configured to sum the electrical signals of an active pixel of the at least one active pixel according to assigned weights to generate the pixel signal for the active pixel.

11. The scanning system of claim 10, wherein:
    the controller is configured to change a location of the active pixel within the pixel area with a change in the time-of-flight of the light beam, and
    the readout circuit is configured to generate a first pixel signal for the active pixel arranged in a first location of the pixel area, generate a second pixel signal for the active pixel arranged in a second location of the pixel area, and generate an averaged pixel signal based on the first pixel signal and the second pixel signal.

12. The scanning system of claim 1, wherein the controller is configured to form at least one deactivated pixel from the at least one deactivated cluster.

13. The scanning system of claim 1, wherein:
    the segmented pixel sensor comprises a plurality of sub-sub-pixel elements used to form the plurality of sub-pixel elements, and
    the controller is configured to selectively group the plurality of sub-sub-pixel elements into the plurality of sub-pixel elements.

14. The scanning system of claim 13, wherein sub-pixel elements are activated by activating their corresponding sub-sub-pixel elements and are deactivated by deactivating their corresponding sub-sub-pixel elements.

15. The scanning system of claim 13, wherein each of the plurality of sub-sub pixel elements is a photo diode, an avalanche photodiode, or a single-photon avalanche diode.

16. A scanning method, comprising:
    driving a scanning structure about at least one scanning axis;
    transmitting a light beam that is directed into a field-of-view by the scanning structure;
    monitoring a time-of-flight of the light beam;
    selectively activating and deactivating a plurality of sub-pixel elements of a segmented pixel sensor into at least one active cluster and at least one deactivated cluster to form one or more active pixels from the at least one active cluster; and
    dynamically changing a clustering of activated sub-pixel elements and a clustering of deactivated sub-pixel elements based on the time-of-flight of the light beam.

17. The method of claim 16, further comprising:
    changing a location of the at least one active cluster and a location of the at least one deactivated cluster to coincide with a change in the time-of-flight of the light beam.

18. The method of claim 16, further comprising:
changing a location of the one or more active pixels with a change in the time-of-flight of the light beam.

19. The method of claim 16, further comprising:
selectively activating the one or more active pixels in one of a plurality of discrete areas of a pixel area, wherein each discrete area of the plurality of discrete areas is assigned to a different one of a plurality of different time-of-flight ranges;

determining a time-of-flight range out of the plurality of different time-of-flight ranges based on the time-of-flight of the light beam; and changing the clustering of activated sub-pixel elements and the clustering of deactivated sub-pixel elements to form the one or more active pixels based on the determined time-of-flight range.

20. The method of claim 16, further comprising:
combining electrical signals generated by sub-pixel elements of the at least one active cluster according to the at least one active pixel to generate a pixel signal for each of the one or more active pixels.

* * * * *